(12) United States Patent
Sivertsen

(10) Patent No.: US 9,377,808 B1
(45) Date of Patent: Jun. 28, 2016

(54) MODULAR COMPUTER ENCLOSURE WITH BRACKET SYSTEM AND ROTATABLE PLATES

(71) Applicant: American Megatrends, Inc., Norcross, GA (US)

(72) Inventor: Clas G. Sivertsen, Lilburn, GA (US)

(73) Assignee: American Megatrends, Inc., Norcross, GA (US)

(*) Notice: Subject to any disclaimer, the term of this patent is extended or adjusted under 35 U.S.C. 154(b) by 32 days.

(21) Appl. No.: 14/176,273

(22) Filed: Feb. 10, 2014

(51) Int. Cl.
*G06F 1/16* (2006.01)

(52) U.S. Cl.
CPC .................................... *G06F 1/16* (2013.01)

(58) Field of Classification Search
CPC ............................................................ G06F 1/18
See application file for complete search history.

(56) References Cited

U.S. PATENT DOCUMENTS

| | | | | |
|---|---|---|---|---|
| 5,684,671 A * | 11/1997 | Hobbs et al. | ............. | 361/679.57 |
| 5,770,928 A * | 6/1998 | Chansky et al. | ............. | 315/362 |
| 5,796,580 A * | 8/1998 | Komatsu et al. | ......... | 361/679.48 |
| 5,877,938 A * | 3/1999 | Hobbs et al. | .................. | 361/724 |
| 6,052,276 A * | 4/2000 | Do et al. | ..................... | 361/679.4 |
| 6,078,503 A * | 6/2000 | Gallagher et al. | ............ | 361/725 |
| 6,157,534 A * | 12/2000 | Gallagher et al. | ............ | 361/724 |
| 6,185,098 B1 * | 2/2001 | Benavides | ..................... | 361/695 |
| 6,316,889 B1 * | 11/2001 | Chansky et al. | .............. | 315/317 |
| 6,324,065 B1 * | 11/2001 | Nelson et al. | ................. | 361/754 |
| 6,400,567 B1 * | 6/2002 | McKeen et al. | ............... | 361/695 |
| 6,452,809 B1 * | 9/2002 | Jackson et al. | ................. | 361/796 |
| 6,459,589 B2 * | 10/2002 | Manweiler et al. | ........... | 361/752 |
| 6,522,547 B1 * | 2/2003 | Diaz et al. | ..................... | 361/724 |
| 6,535,382 B2 * | 3/2003 | Bishop et al. | ................. | 361/690 |
| 6,985,357 B2 * | 1/2006 | Cauthron | ...................... | 361/724 |
| 7,226,353 B2 * | 6/2007 | Bettridge et al. | .............. | 454/184 |
| 7,242,576 B2 * | 7/2007 | Coster et al. | ............. | 361/679.58 |
| 7,327,563 B2 * | 2/2008 | Cauthron | ................ | 361/679.55 |
| 7,788,940 B2 * | 9/2010 | Madara et al. | ............... | 62/259.2 |
| 7,956,284 B2 * | 6/2011 | Bravo et al. | ..................... | 174/50 |
| 8,289,717 B2 * | 10/2012 | Heimann et al. | .............. | 361/748 |
| 8,325,479 B2 * | 12/2012 | Siracki et al. | .............. | 361/679.5 |
| 8,403,736 B2 * | 3/2013 | Rasmussen et al. | .......... | 454/184 |
| 8,477,491 B1 * | 7/2013 | Ross et al. | ................. | 361/679.5 |
| 8,925,739 B2 * | 1/2015 | Crippen et al. | .................. | 211/26 |
| 2005/0068733 A1 * | 3/2005 | Squillante | ..................... | 361/697 |
| 2006/0055135 A1 * | 3/2006 | Tracewell et al. | ......... | 280/47.35 |
| 2007/0242426 A1 * | 10/2007 | Coster et al. | .................. | 361/687 |
| 2010/0290604 A1 * | 11/2010 | Wright et al. | ............ | 379/102.04 |
| 2012/0014063 A1 * | 1/2012 | Weiss | ............................. | 361/697 |

* cited by examiner

*Primary Examiner* — Lisa Lea Edmonds
(74) *Attorney, Agent, or Firm* — Lee & Hayes, PLLC

(57) ABSTRACT

A modular computer enclosure is disclosed that can include a housing, one or more doors, and a modular bracket system. The housing is configured to receive a wall mount, whereby the wall mount is affixed to a wall and the housing is removably coupled to the wall mount. The modular bracket system can include an outer bracket and an inner bracket. The modular bracket system can be configured to receive one or more plates of various sizes. The plates are configured to receive one or more computing components. The plates can be installed, removed, and replaced by other plates depending on the particular application.

27 Claims, 24 Drawing Sheets

MODULAR COMPUTER ENCLOSURE WITH BRACKET SYSTEM AND ROTATABLE PLATES

BACKGROUND

The use of computers has become ubiquitous in all types of industries, from industrial manufacturing to restaurants. When computers are installed and utilized in non-optimal operating environments, such as in quick serve restaurants ("QSRs") where water, smoke and/or grease may be present, a generic, "off the shelf" computer may not be the preferred, or even viable, option. Often, these uses require a specially configured computer system having components and capabilities tailored to the particular environment in which it is used. In some conventional systems, however, it may be difficult to install or remove computing components from the computer in order to configure the computer for a specific location or industry.

It is with respect to these and other considerations that the various embodiments described below are presented.

SUMMARY

A modular computer enclosure is disclosed herein. The modular computer enclosure includes a housing, one or more doors, and a modular bracket system. Some configurations of the modular computer enclosure can be used in instances in which the installation, configuration and service is required to be performed by only one service technician or installer. The housing is configured to receive a wall mount, whereby the wall mount is affixed to a wall and the housing is removably coupled to the wall mount. The modular bracket system includes an outer bracket and an inner bracket. The modular bracket system is configured to receive one or more plates of various sizes. The plates are configured to receive one or more computing components. The plates can be installed, removed, and replaced by other plates depending on the particular application. The plates can include one or more securement appendages configured to secure a component to the plate. The plates are designed so that they can be rotated and mounted at any angle up to 90 degrees, and the function of the plate when placed at a particular angle may be specialized for a particular component for each position of that rotation, and text with arrows readable horizontally for each possible rotation may indicate the mounting patterns that should be used and the components that can be used for that particular rotation. In addition the plates may have a different function depending on which side of the plate faces to the front or back. The plates may also be color coded with the same or different color front and back to indicate to a technician or purchaser what the specific function of a plate is relating to its color. For example a "red" plate could be for a power supply, whereas the other side of the plate may be "blue" and used to mount a motherboard. Patterns, outlines of components, text and arrows may be printed on the plates to indicate which mounting holes or mounting features should be used, and give additional instructions about how to use that particular plate correctly.

According to one aspect disclosed herein, a modular computer enclosure is described. The modular computing enclosure includes a housing configured to house components within the housing, one or more doors rotatably coupled to the housing, and a modular bracket system affixed to the housing. The modular bracket system includes an inner bracket configured to receive one or more plates. The modular computer enclosure also includes one or more plates configured to receive one or more computing components and for installation in the housing.

According to an additional aspect disclosed herein, a modular computer enclosure is described. The modular computer enclosure includes a housing configured to house components within the housing, a first door rotatably coupled to the housing through a first hinge apparatus and proximate to a top portion of the housing, and a second door rotatably coupled to the housing through a second hinge apparatus and proximate to a bottom portion of the housing. The first hinge apparatus and the second hinge apparatus each include a first hinge fixedly attached to the first door or the second door, a second hinge fixedly attached to the housing, and a hinge pin inserted through the first hinge and the second hinge. The hinge pin is sized and shaped that the hinge pin not removable when the door is in a shut orientation and removable when the door is in an open orientation. However, if the hinge pin is mounted from the center of the housing rather from the side, it may be removed from the outside of the box. Thus, the pin installation orientation may determine whether the pin is removable or non-removable, giving installers an option to still open the box by using a tool for those technicians who know about this feature, and thus avoid having to damage the box in case the key is lost.

The hinges may be used to mount either a single door that is hinged from the top or hinged from the bottom. In the case of the single door configuration of the box, the hinges on the opposite side of the box serve as a tension feature for the door as the shape of the hinge is rounded, and will receive the door as it is closed with gradual pressure as the door shuts.

The modular computer enclosure also may also include a first plurality of supports coupled to the first door and the housing, the first plurality of supports configured to maintain the first door in a desired position and a second set of supports coupled to the second door and the housing, the second set of supports configured to extend in a controlled manner to provide a smooth opening motion for the second door. The modular computer enclosure may further include a first air filter disposed within a portion of the housing and proximate to the top portion of the housing, wherein the first air filter is configured to filter at least a portion of air entering the housing, a second air filter disposed proximate to the bottom portion of the housing, wherein the second air filter is configured to filter at least a portion of air entering the housing and a modular bracket system affixed to the housing. The modular bracket system includes an inner bracket configured to receive at least a first plate, and an outer bracket configured to receive at least a second plate. The inner bracket and the outer bracket are further configured to receive a first computing component. The modular computer enclosure additionally includes one or more plates configured to receive the first computing component or a plurality of second computing components.

These and various other features as well as advantages will be apparent from a reading of the following detailed description and a review of the associated drawings.

DETAILED DESCRIPTION

Figure 1:
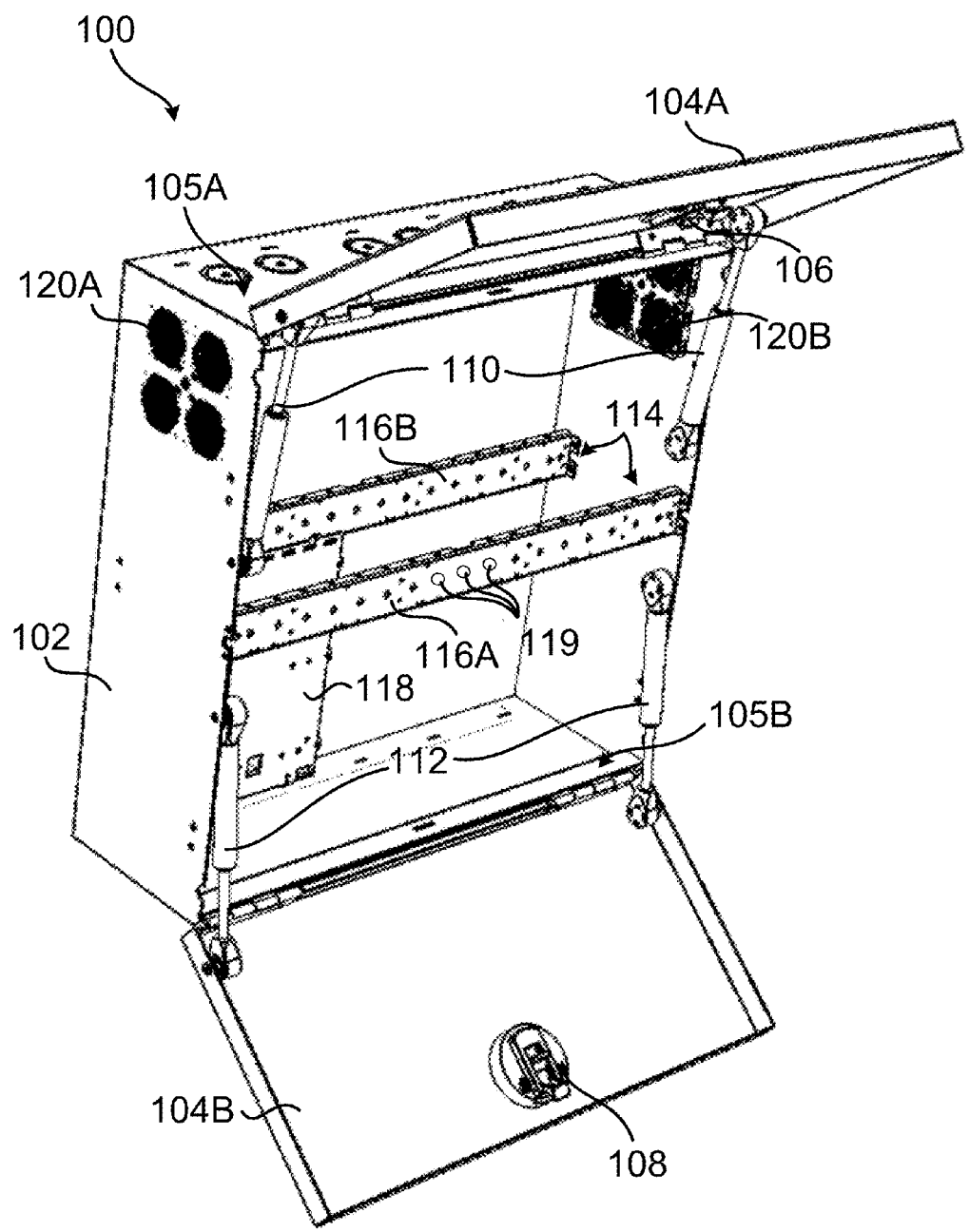
FIG. 1 a diagram showing a perspective view of a modular computer enclosure according to at least one embodiment disclosed herein.

A modular computer enclosure is disclosed herein. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein will be described.

FIG. 1 a diagram showing a perspective view of a modular computer enclosure 100 according to at least one embodiment disclosed herein. In the configuration illustrated in FIG. 1, the modular computer enclosure 100 includes a housing 102, a first door 104A, and a second door 104B. The housing 102 is configured to house computer components within the housing 102. The housing 102 can be constructed from various suitable materials including, but not limited to, metal, carbon fiber, plastic, and the like. In some examples, the housing 102 is constructed from a material able to withstand an impact of an object without significant deformation of the housing 102.

The first door 104A is rotatably coupled to the housing 102 and is installed proximate to a top portion 105A of the housing 102. The second door 104B is rotatably coupled to the housing 102 and is installed proximate to a bottom portion 105B of the housing 102. The first door 104A includes a first locking mechanism 106. The second door 104B includes a second locking mechanism 108. The first locking mechanism 106 and the second locking mechanism 108 are configured to engage with cooperative portions of a bracket, described in more detail below, to provide for the locking of the first door 104A to the second door 104B, securing to a degree the modular computer enclosure 100.

The first door 104A is rotatably coupled to the housing through a hinge apparatus (not shown in FIG. 1). In some examples, it may be desirable or necessary to maintain the first door 104A at one or more open positions (such as the position illustrated in FIG. 1). Thus, the first door 104A may have one or more supports 110 coupled thereto. The supports 110 can be hydraulic, pneumatic, or combinations thereof. In one configuration, the supports 110 are configured to maintain the first door 104A in a desired position. For example, a user may open the first door 104A to the position illustrated in FIG. 1. The supports 110 are configured to apply an upward pressure on the first door 104A to counteract the effect of gravity on the first door 104A, maintaining the first door 104A in the desired position.

The second door 104B is rotatably coupled to the housing through a hinge apparatus (not shown in FIG. 1). In some examples, it may be desirable to provide for a fluid, smooth opening motion for the second door 104B. As used herein, "smooth" means a controlled rate of motion. For example, when moving the second door 104B from a closed position, it may be desirable or necessary to prevent the second door 104B from opening in an uncontrolled manner, as this may damage equipment or personnel. To provide for a controlled opening motion, the second door 104B is coupled to supports 112 in one embodiment. Unlike the supports 110, whereby the supports 110 are designed to maintain a position of the first door 104A, the supports 112 are configured to extend in a controlled manner to provide a smooth opening motion for the second door 104B.

The modular computer enclosure 100 also includes a modular bracket system 114. The modular bracket system 114 is configured to operate in conjunction with the housing 102 to secure one or more computing components in the housing 102. Although not limited to any type or number, the computing components can include, but are not limited to, a computer motherboard, PCI boards, CPU fans, and the like.

The modular bracket system 114 includes an outer bracket 116A and an inner bracket 116B in one embodiment. The outer bracket 116A and the inner bracket 116B are removably affixed to the housing 102. The outer bracket 116A and the inner bracket 116B may be used independently of or in conjunction with each other. The outer bracket 116A and/or the inner bracket 116B are designed to receive one or more plates, shown by way of example as plate 118. As mentioned briefly above, the first locking mechanism 106 and the second locking mechanism may be configured to be cooperative coupled to the outer bracket 116 to secure the first door 104A and the second door 104B in a closed position.

In some configurations, it may be desirable or necessary to provide indications to a user. In these configurations, the modular computer enclosure 100 includes one or more visual indicators, such as a circuit board containing one or more light emitting diodes ("LEDs") 119 affixed to the outer bracket 116A. The first door 104A, the second door 104B and the outer bracket 116A may be sized and shaped appropriately that when the first door 104A and the second door 104B are in the closed position and secured to the outer bracket 116A, the LEDs 119 are visible from the outside of the housing 102. The LEDs 119 may be used to indicate various conditions monitored by computing components in the modular computer enclosure 100 while the first door 104A and the second door 104B are secured to the outer bracket 116A. It should be noted that other types of lights may be used. Further, audible indicators may be used and are considered to be within the scope of the present disclosure.

As in some computing systems, while operating, the computing equipment installed in the housing 102 may generate heat. To maintain the temperature within the housing 102 to an acceptable level, fan assemblies 120A and 120B may be provided. The fan assemblies 120A and 120B are designed to pull air from inside the housing 102 and exhaust the air outside the housing 102. The differential pressure created by the fan assemblies 120A and 120B cause preferably cooler air to enter the housing 102, removing at least a portion of the heat generated by the internal components. Additional details regarding the fan assemblies 120 will be provided below.

Figure 2:
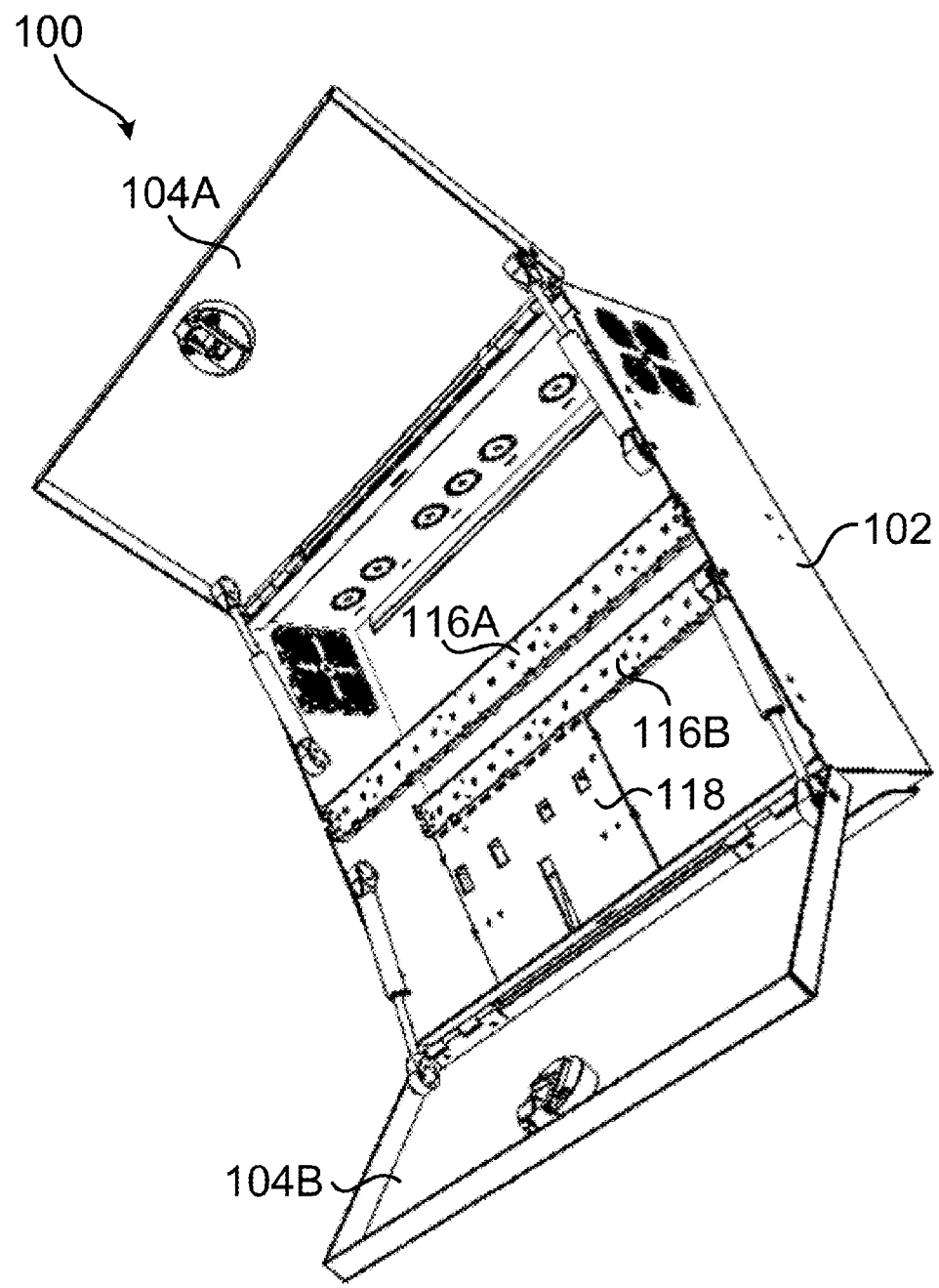
FIG. 2 is a diagram showing a bottom perspective view of a modular computer enclosure according to at least one embodiment disclosed herein.

FIG. 2 is a diagram showing a bottom perspective view of the modular computer enclosure 100 according to at least one embodiment disclosed herein. As shown, the modular computer enclosure 100 includes the housing 102, the first door 104A, and the second door 104B. Also illustrated are the outer bracket 116A and the inner bracket 116B. In the perspective provided by FIG. 2, it can be seen that the plate 118 is removably affixed to the inner bracket 116B. It should be noted that, in some configurations, the plate 118 may be removably affixed to the outer bracket 116B.

Figure 3:
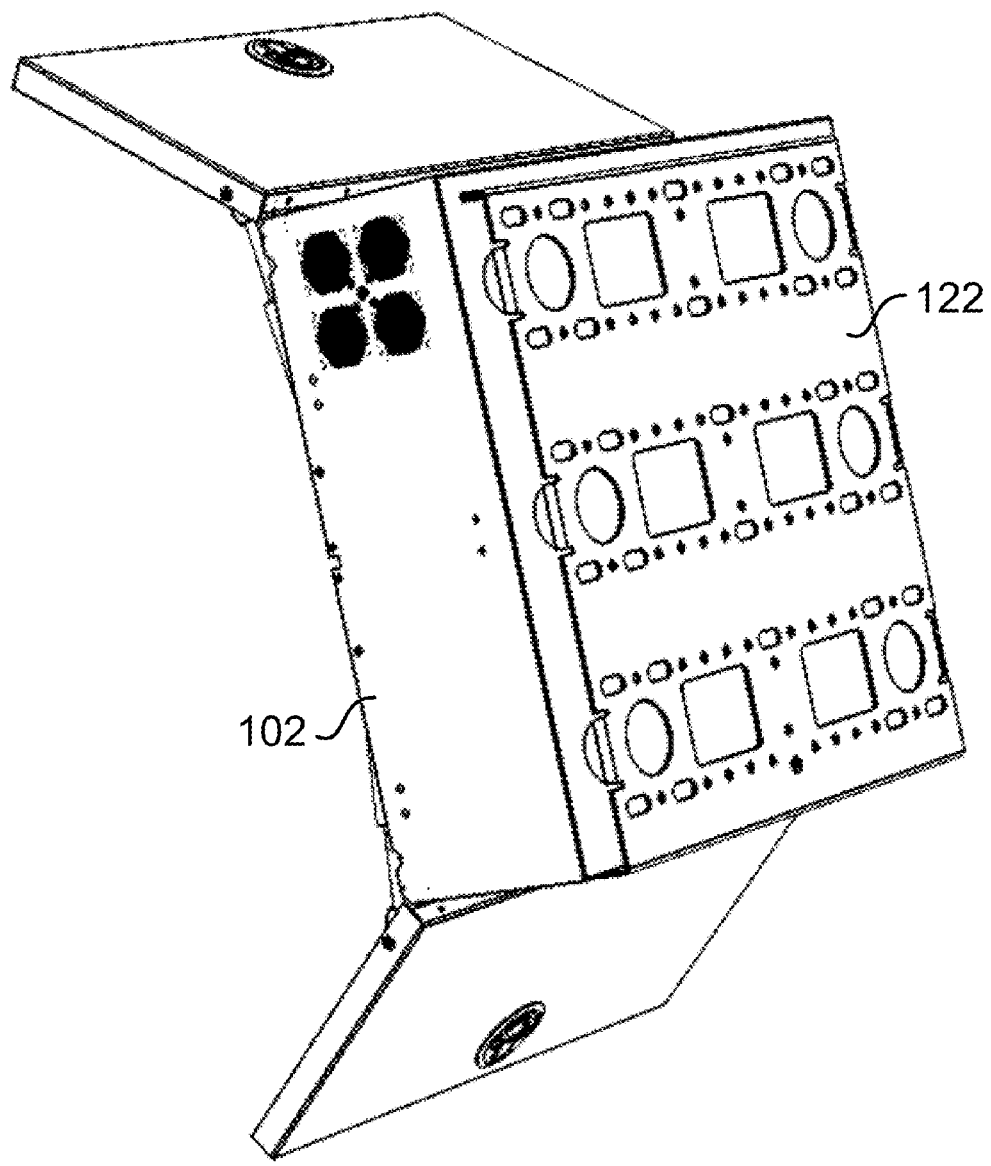
FIG. 3 is a diagram showing a rear, perspective view of a modular computer enclosure according to at least one embodiment disclosed herein.

FIG. 3 is a diagram showing a rear, perspective view of the modular computer enclosure 100 according to at least one embodiment disclosed herein. Shown are the housing 102 and a wall mount 122. The wall mount 122 is configured to be removably coupled to the housing 102. The wall mount 122 has one or more apertures operative to facilitate the use of securement devices, such as a threaded fastener or rivet, to affix, either removably or permanently, the wall mount 122 to a surface such as a wall (not shown). The housing 102 is designed to receive and couple to the wall mount 122 to install the housing 102 onto a surface, described in more detail in relation to FIGS. 4 and 5, below.

Figure 4:
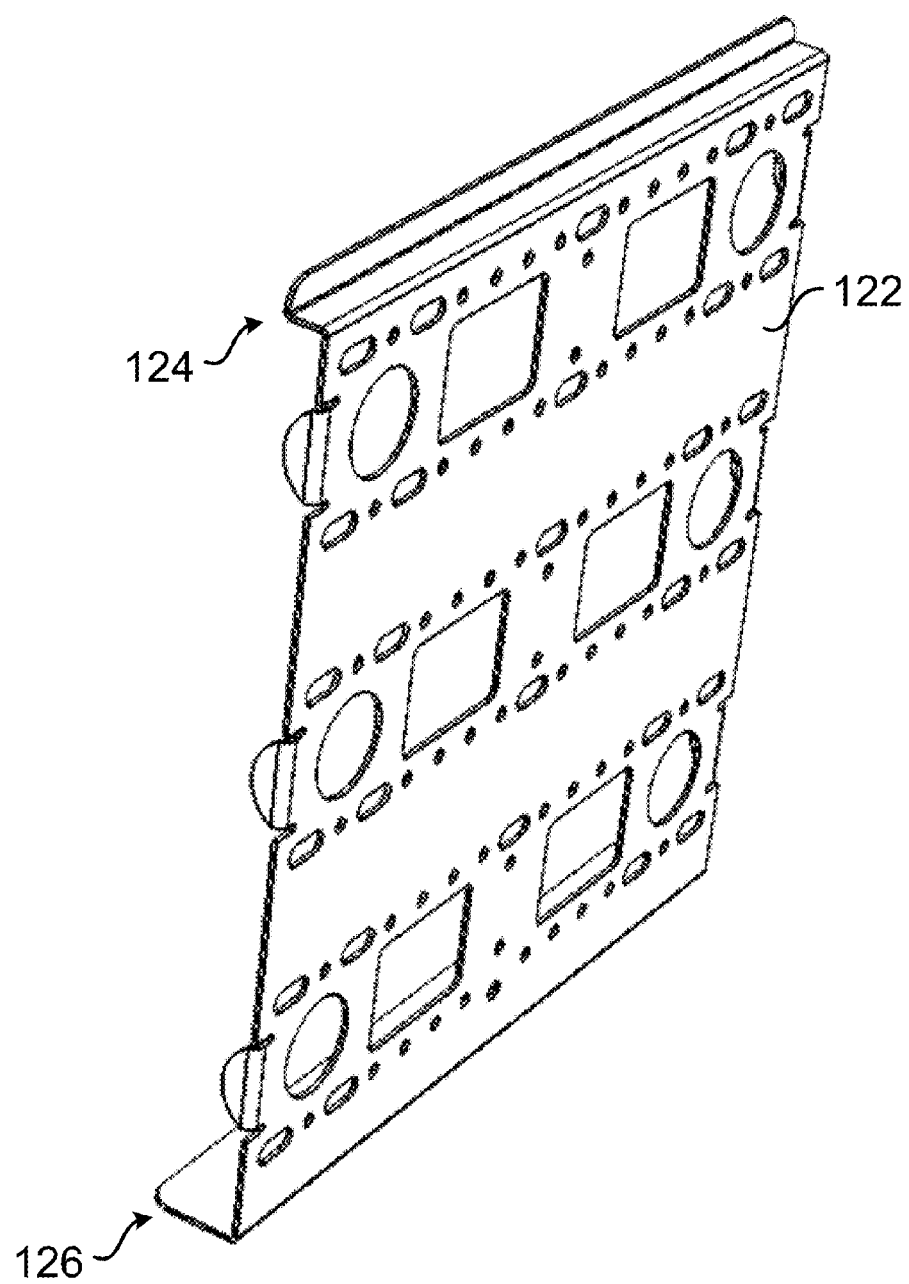
FIG. 4 is a diagram showing a top perspective view of a wall mount according to at least one embodiment disclosed herein.

FIG. 4 is a diagram showing a top perspective view of the wall mount 122. The wall mount includes a wall mount lip 124 and wall mount support 126 according to at least one embodiment disclosed herein. The wall mount lip 124 is designed to be received within a channel of the housing 102, shown in more detail in FIG. 5. The wall mount support 126 is designed to receive at least a portion of the weight of the housing 102. In some configurations, the entire weight of the housing 102 maybe supported at the wall mount lip 124, whereby the wall mount support 126 provides support if the wall mount lip 124 cannot support all or a portion of the weight of the housing 102.

Figure 5:
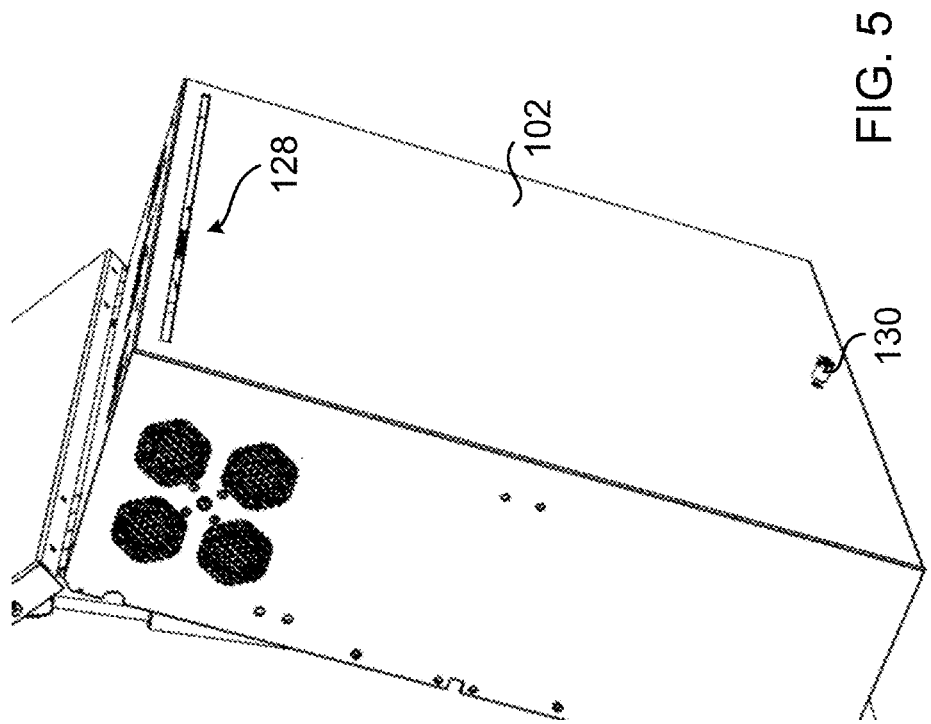
FIG. 5 is a diagram showing a rear perspective view of an enclosure illustrating a receiving channel for receiving a wall mount lip according to at least one embodiment disclosed herein.

FIG. 5 is a diagram showing a rear perspective view of the housing 102 illustrating a receiving channel 128 for receiving the wall mount lip 124 according to at least one embodiment disclosed herein. The receiving channel 128 extends at least a portion of the length along the backside of the housing 102. The receiving channel 128 is configured to receive the wall mount lip 124. In one configuration, the housing 102 is rotated in a generally normal orientation with respect to the wall mount 122. The wall mount lip 124 is inserted into the receiving channel 128. Once the wall mount lip 124 is inserted an appropriate amount, the housing 102 is rotated to a generally parallel orientation with respect to the wall mount 122. The housing 102 may be further secured to the wall mount 122 using securement member 130, which may be a threaded member having threads that are cooperatively received into the wall mount 122.

Figure 6:
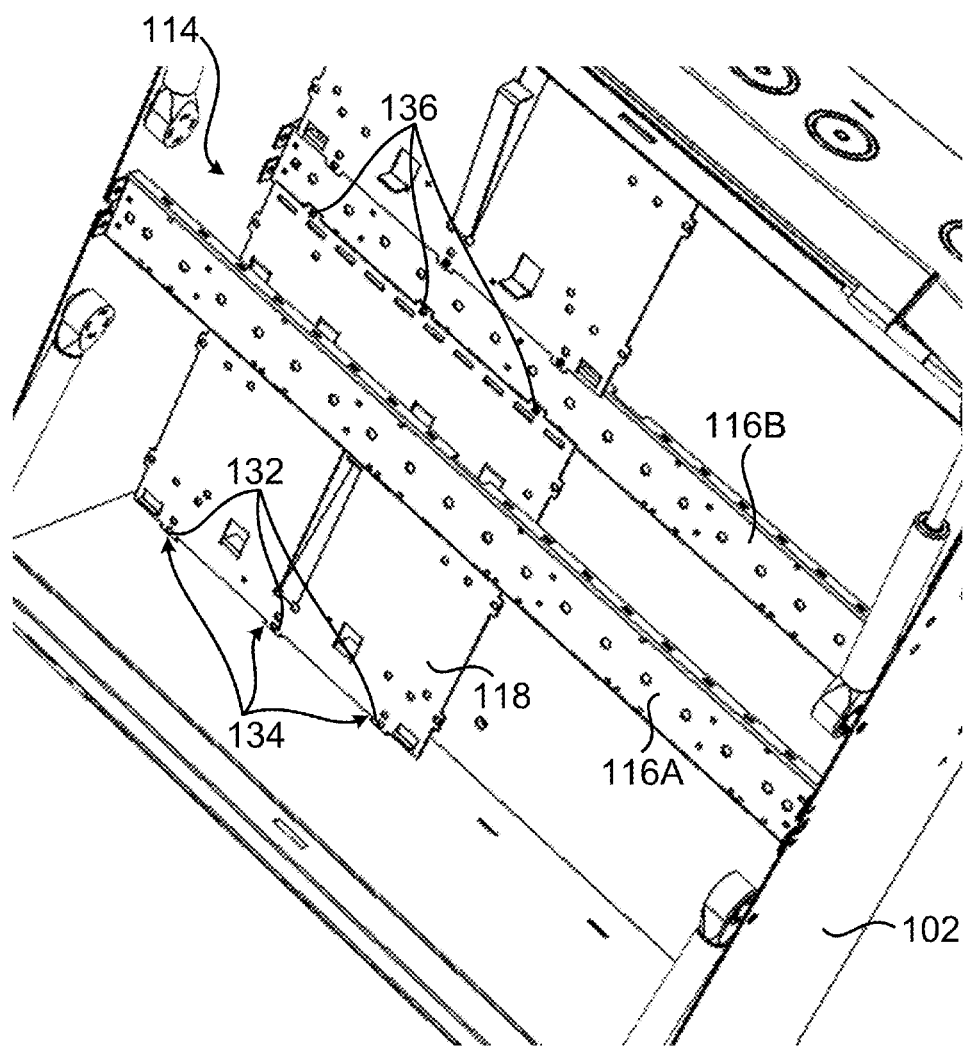
FIG. 6 is a diagram showing additional details how a plate is removably affixed to a modular bracket system according to at least one embodiment disclosed herein.

FIG. 6 is a diagram showing additional details how the plate 118 is removably affixed to the modular bracket system 114 according to at least one embodiment disclosed herein. As described above in FIG. 1, the modular bracket system 114 includes the outer bracket 116A and the inner bracket 116B. As mentioned above, the modular bracket system 114 can include either the outer bracket 116A and the inner bracket 116B, or both, which is the configuration illustrated in FIG. 6.

The plate 118 is coupled to the housing 102 by inserting tabs 132 of the plate 118 into apertures 134 of the housing 102. The use of the tabs 132 and the apertures 134 can help provide a level of securement of the plate to the enclosure while completing the final installation. In some conventional systems, an installer may have to continually support a component throughout most, if not all, of the installation procedure. Using the tabs 132 and the apertures 134 allows the weight of the plate 118 to be supported by the enclosure and also prevents or minimizes lateral movement of the plate 118 near the tabs 132. This may help stabilize the plate 118 to reduce the effort an installer needs to exert in order to secure the plate 118 to the inner bracket 116B. The plate 118 is affixed to the inner bracket 116B through the use of securement members 136, which in some configurations are threaded members or fasteners, to complete the installation of the plate 118 to the inner bracket 116B.

Figure 7:
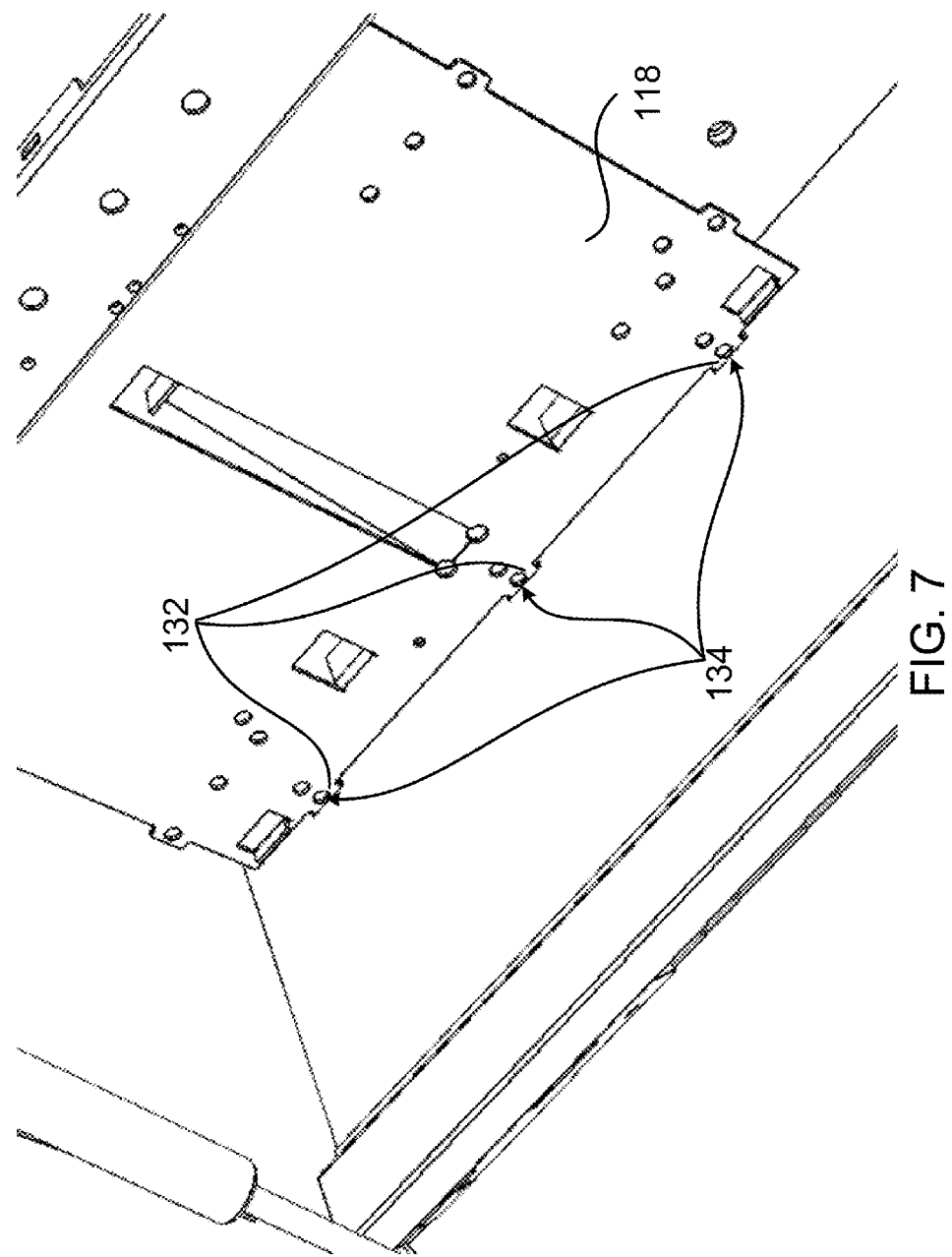
FIG. 7 is a diagram showing a close-up view of a tabs and apertures according to at least one embodiment disclosed herein.
Figure 8:
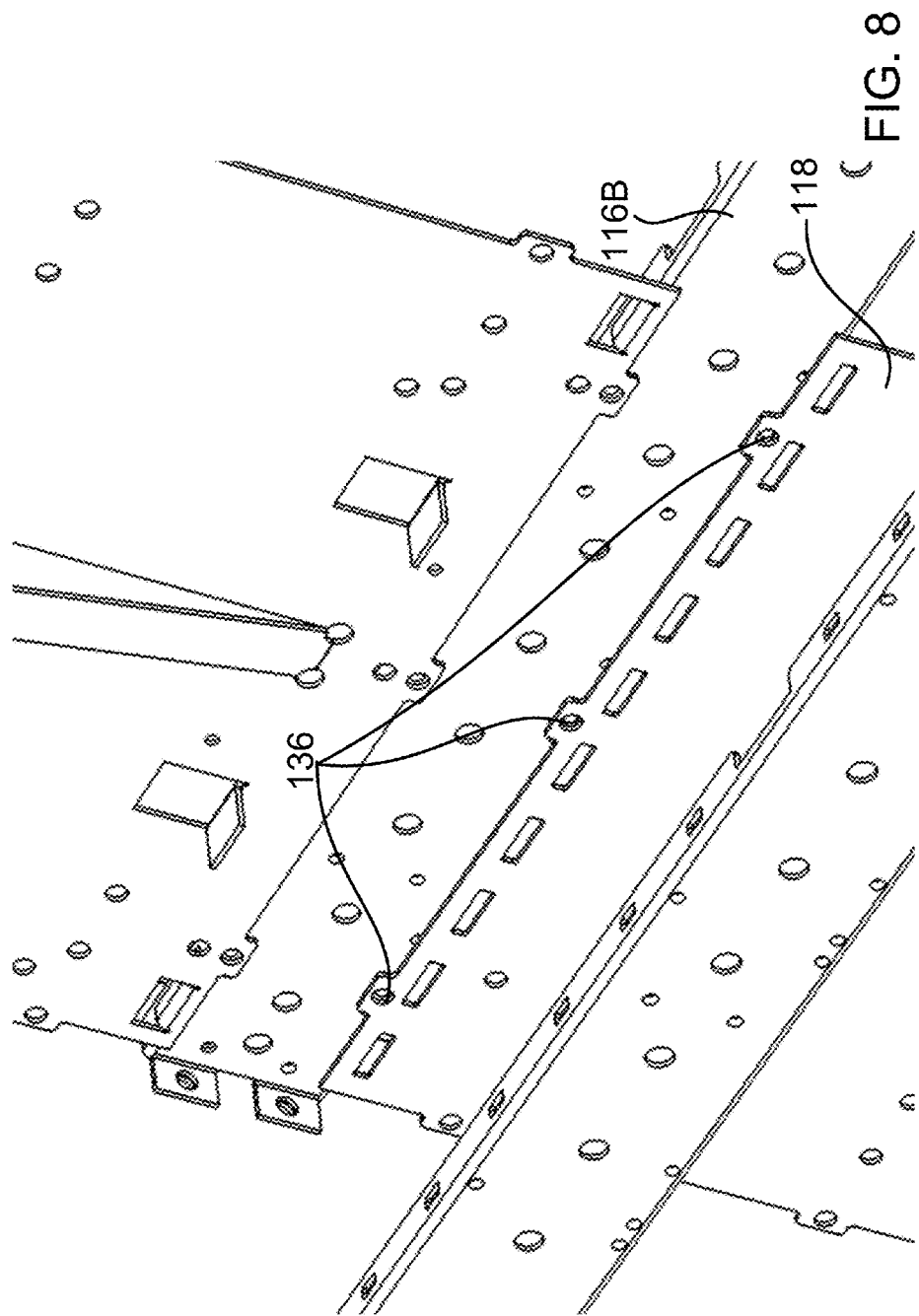
FIG. 8 is a diagram showing a close-up view of securement members used to secure a plate to an inner bracket according to at least one embodiment disclosed herein.

FIG. 7 is a diagram showing a close-up view of the tabs 132 and the apertures 134 according to at least one embodiment disclosed herein. As noted above, the tabs 132 are configured for insertion into and removal from the apertures 134. FIG. 8 is a diagram showing a close-up view of securement members 136 used to secure the plate 118 to the inner bracket 116B according to at least one embodiment disclosed herein.

Figure 9:
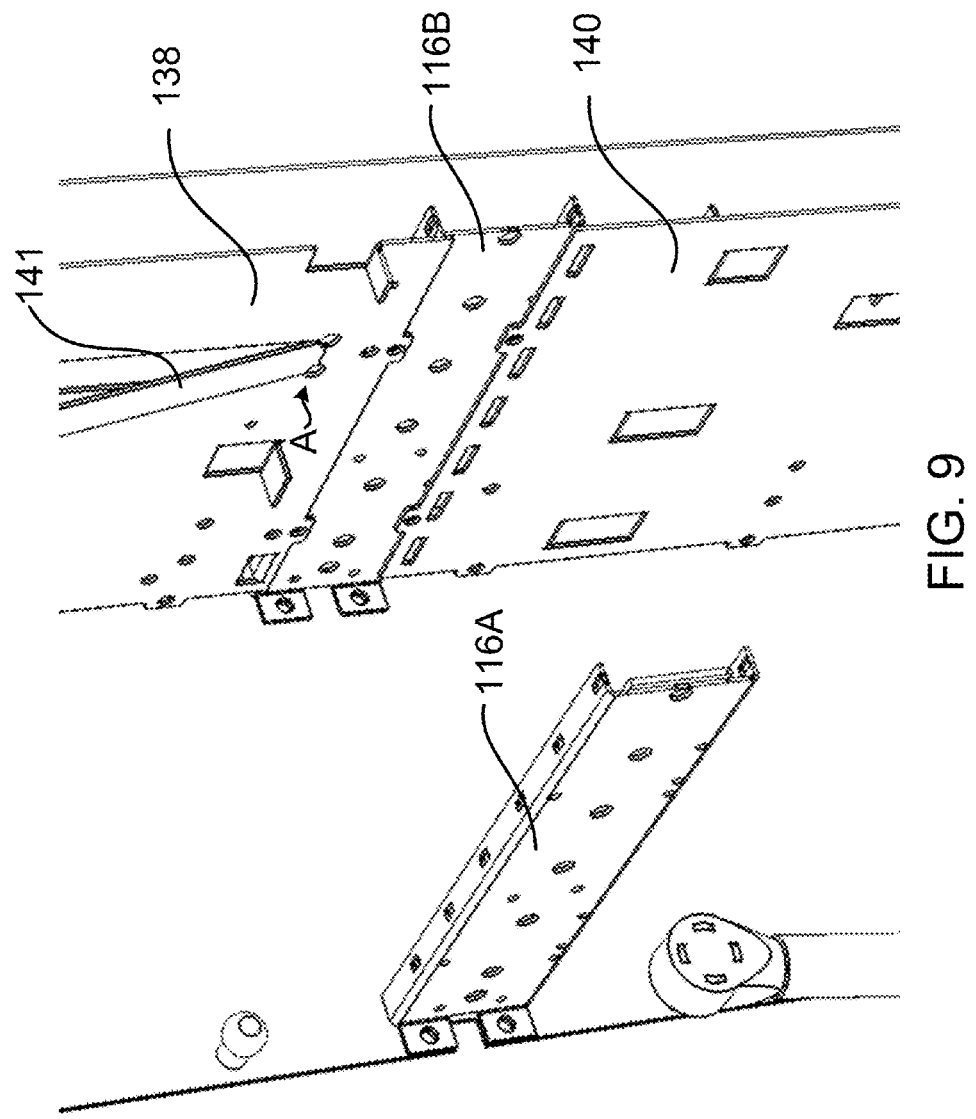
FIG. 9 is a side perspective, cross-sectional view of an outer bracket and an inner bracket with various types of plates mounted thereon according to at least one embodiment disclosed herein.

FIG. 9 is a side perspective, cross-sectional view of the outer bracket 116A and the inner bracket 116B with various types of plates mounted thereon according to at least one embodiment disclosed herein. The inner bracket 116B has multiple plates affixed thereto, a plate 138 and a plate 140. The plate 138 is affixed to the inner bracket 116B in a position above the inner bracket 116B. Likewise, the plate 140 is affixed to the inner bracket 116B in a position below the inner bracket 116B. The plate 138 is installed in a manner similar to the description of the installation of the plate 118 in FIGS. 7 and 8, using a similar tab/aperture arrangement, described in further detail in FIG. 10, below.

As mentioned above, the plates used in various configurations described herein may have installed thereon various types of computing components. Thus, some of the plates may have one or more features configured to allow the installation of the computing component onto the plate. For example, the plate 138 has retaining member 141. The retaining member 141 is rotatable about the point A to secure a computing component to the plate 138, described in more detail in FIGS. 12-13, below.

Figure 10:
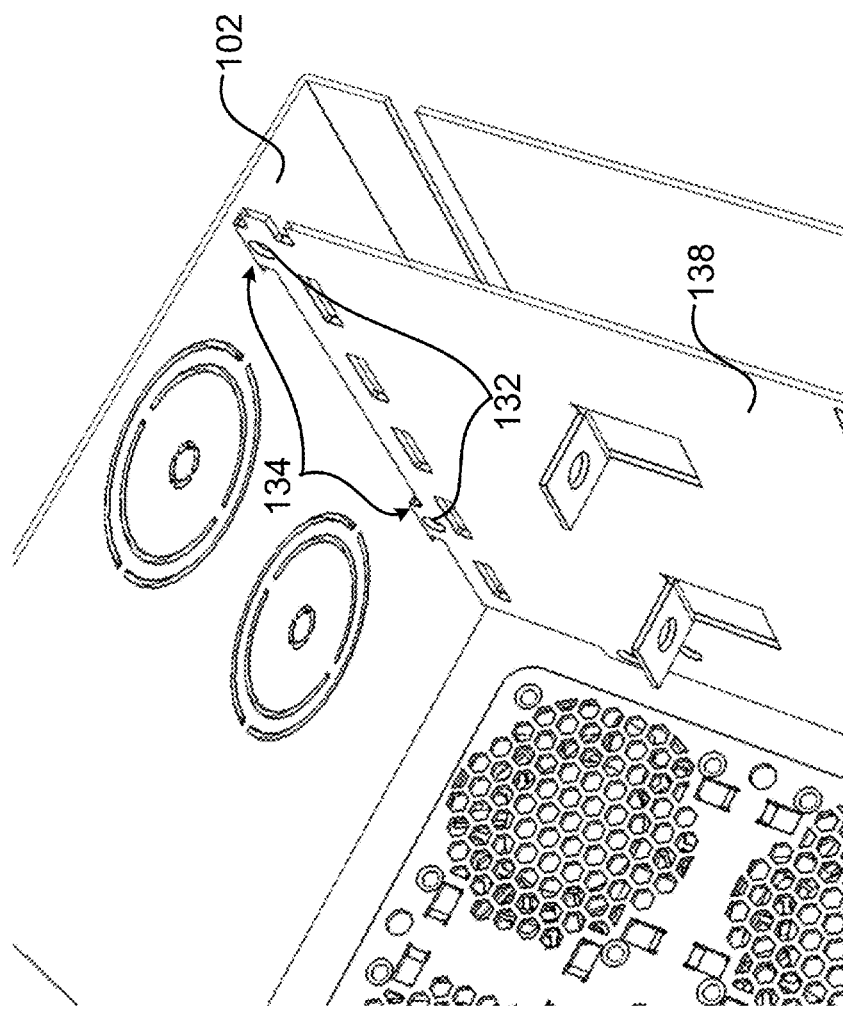
FIG. 10 is a drawing of a close-up, perspective, cross-sectional view of a plate coupled to an enclosure according to at least one embodiment disclosed herein.
Figure 11:
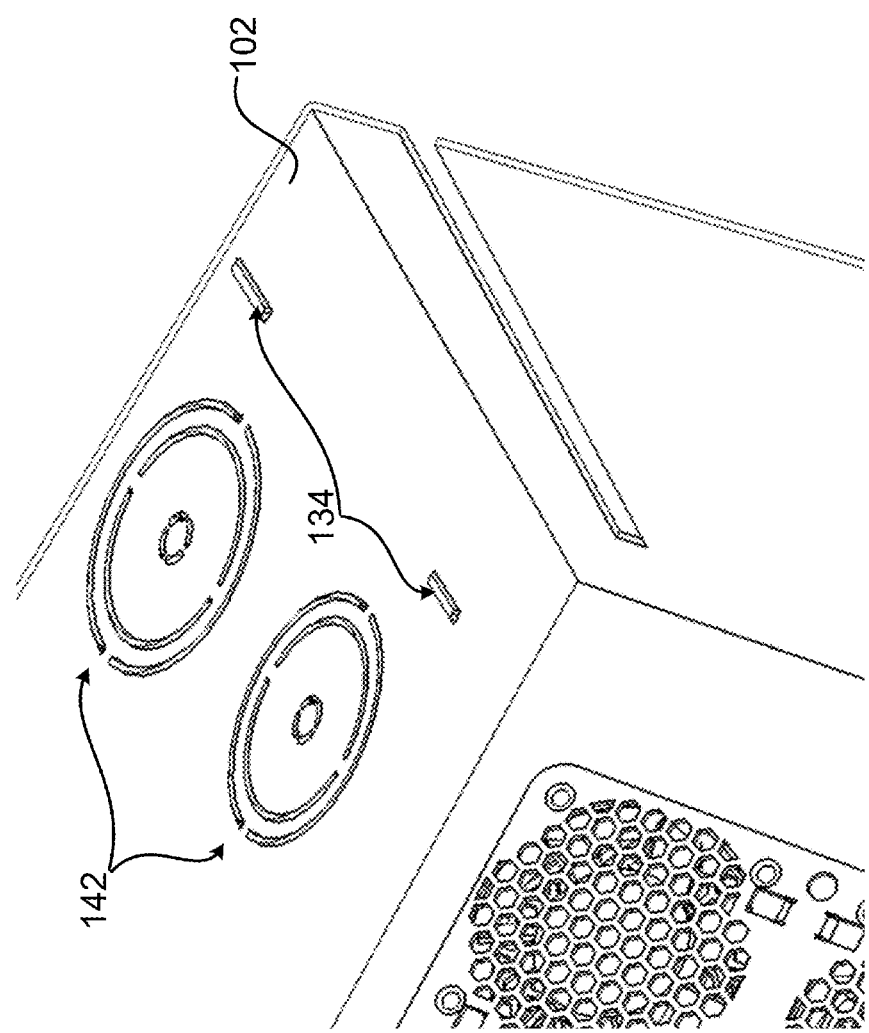
FIG. 11 is a drawing of a close-up, perspective, cross-sectional view without a plate showing the apertures according to at least one embodiment disclosed herein.

FIG. 10 is a drawing of a close-up, perspective, cross-sectional view of the plate 138 coupled to the housing 102 according to at least one embodiment disclosed herein. The tabs 132 of the plate 138 are configured to be received within the apertures 134 of the housing 102. FIG. 11 is a drawing of a close-up, perspective, cross-sectional view without the plate 138 showing the apertures 134 according to at least one embodiment disclosed herein. Also illustrated in FIG. 11 are pop-outs 142. The pop-outs 142 are portions of the housing 102 in which material has been removed. A user can apply a force to "pop out," or remove, part of the housing 102 to form an aperture. After the removal of the material, the aperture formed using the pop-outs 142 can be used to install devices such as antennae or allow cable to be inserted into the housing 102.

Figure 12:
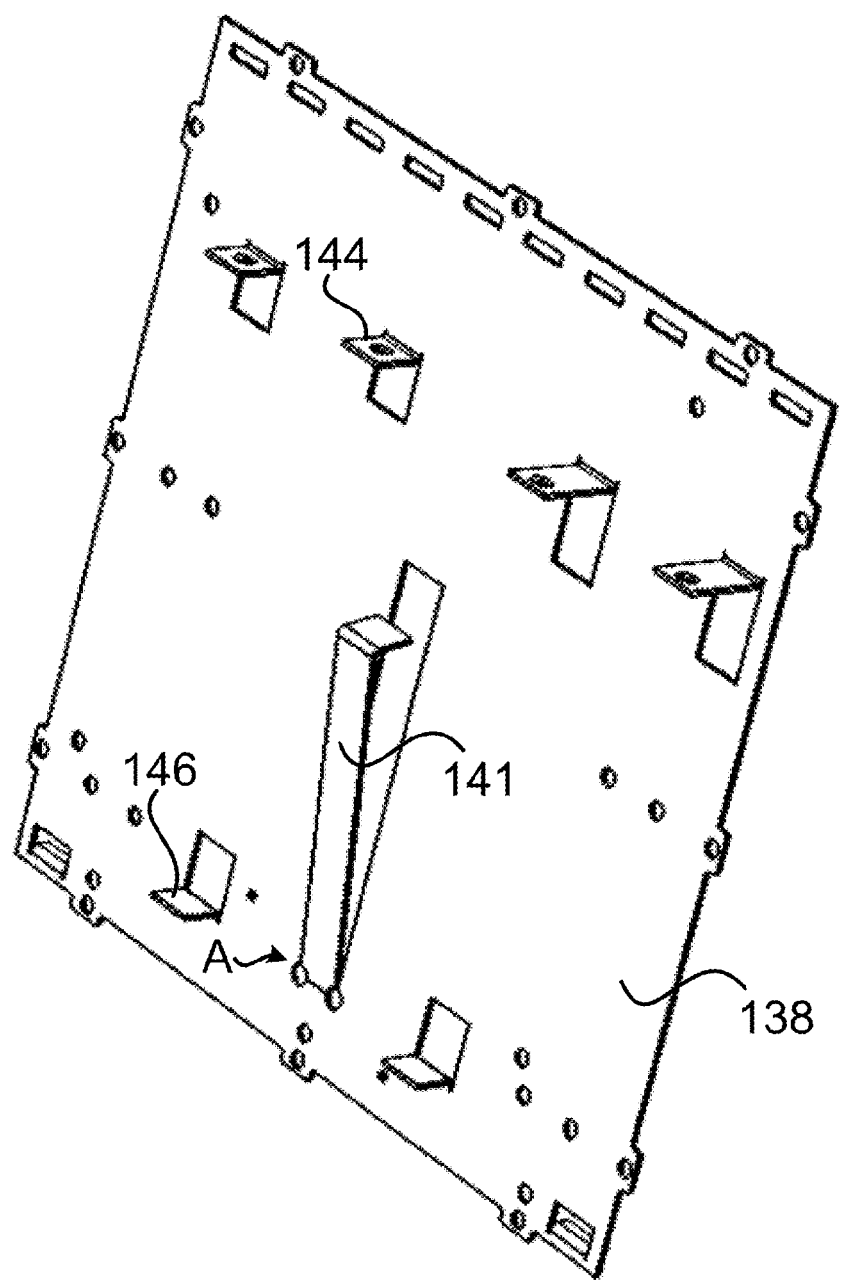
FIG. 12 is a drawing of a side perspective view of a plate illustrating securement mechanisms for securing computing components to the plate according to at least one embodiment disclosed herein.

FIG. 12 is a drawing of a side perspective view of the plate 138 illustrating securement mechanisms for securing computing components to the plate 138 according to at least one embodiment disclosed herein. The plate 138 includes the retaining member 141 is rotatable about the point A to secure a computing component to the plate 138, an example of which is described in relation to FIG. 13, below.

The plate 138 also includes other securement mechanisms. For example, the plate 138 includes an affixment tab 144 configured to receive a threaded securement member to secure a computing component. Another example of a securement mechanism is a support tab 146. The support tab 146 is used to prevent movement of a computing device in a particle direction.

Figure 13:
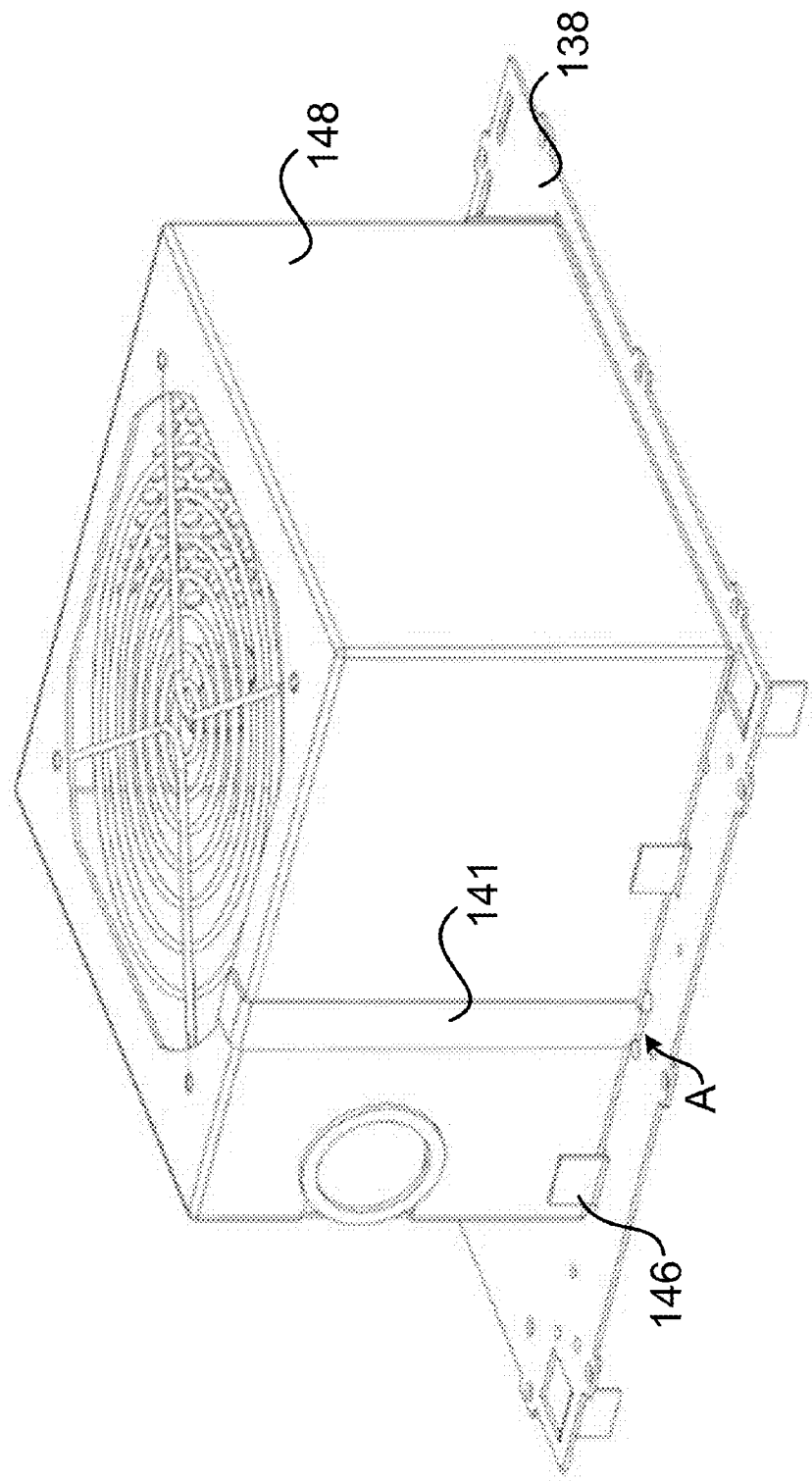
FIG. 13 is a drawing of a side perspective view of a plate in which a cooling fan is installed on the plate according to at least one embodiment disclosed herein.

FIG. 13 is a drawing of a side perspective view of the plate 138 in which a cooling fan 148 is installed on the plate 138 according to at least one embodiment disclosed herein. The retaining member 141 has been rotated about point A. The cooling fan 148 is placed on the plate 138 and secured by the retaining member and the support tab 146. The cooling fan 148 may be additionally secured using a threaded securement member and the affixement tab 144, illustrated in FIG. 12.

Figure 14:
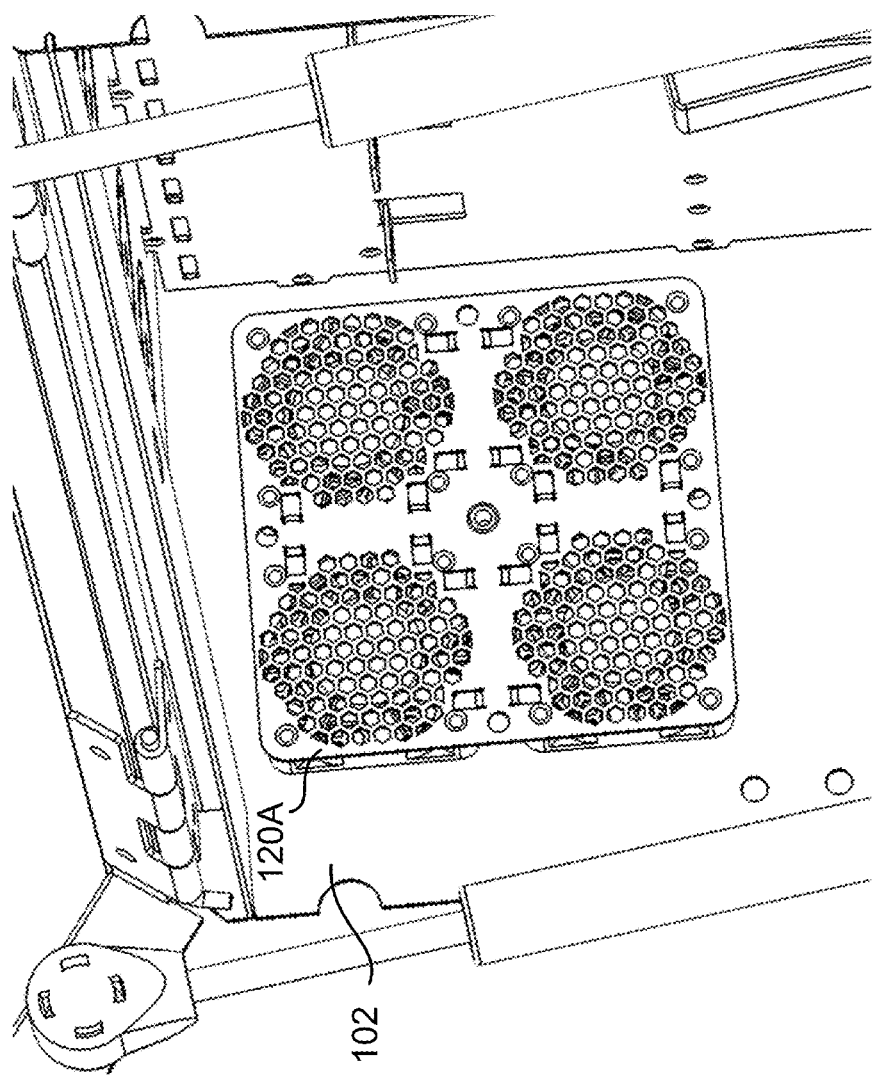
FIG. 14 is a drawing of a side perspective view showing a fan assembly installed on an enclosure according to at least one embodiment disclosed herein.

FIG. 14 is a drawing of a side perspective view showing the fan assembly 120A installed on the housing 102 according to at least one embodiment disclosed herein. As discussed above in FIG. 1, the fan assembly 120A is designed to pull air from inside the housing 102 and exhaust the air to the outside environment. The differential pressure created by the fan assembly 120A causes preferably cooler air to enter the housing 102, removing at least a portion of the heat generated by the internal computing components.

Figure 15:
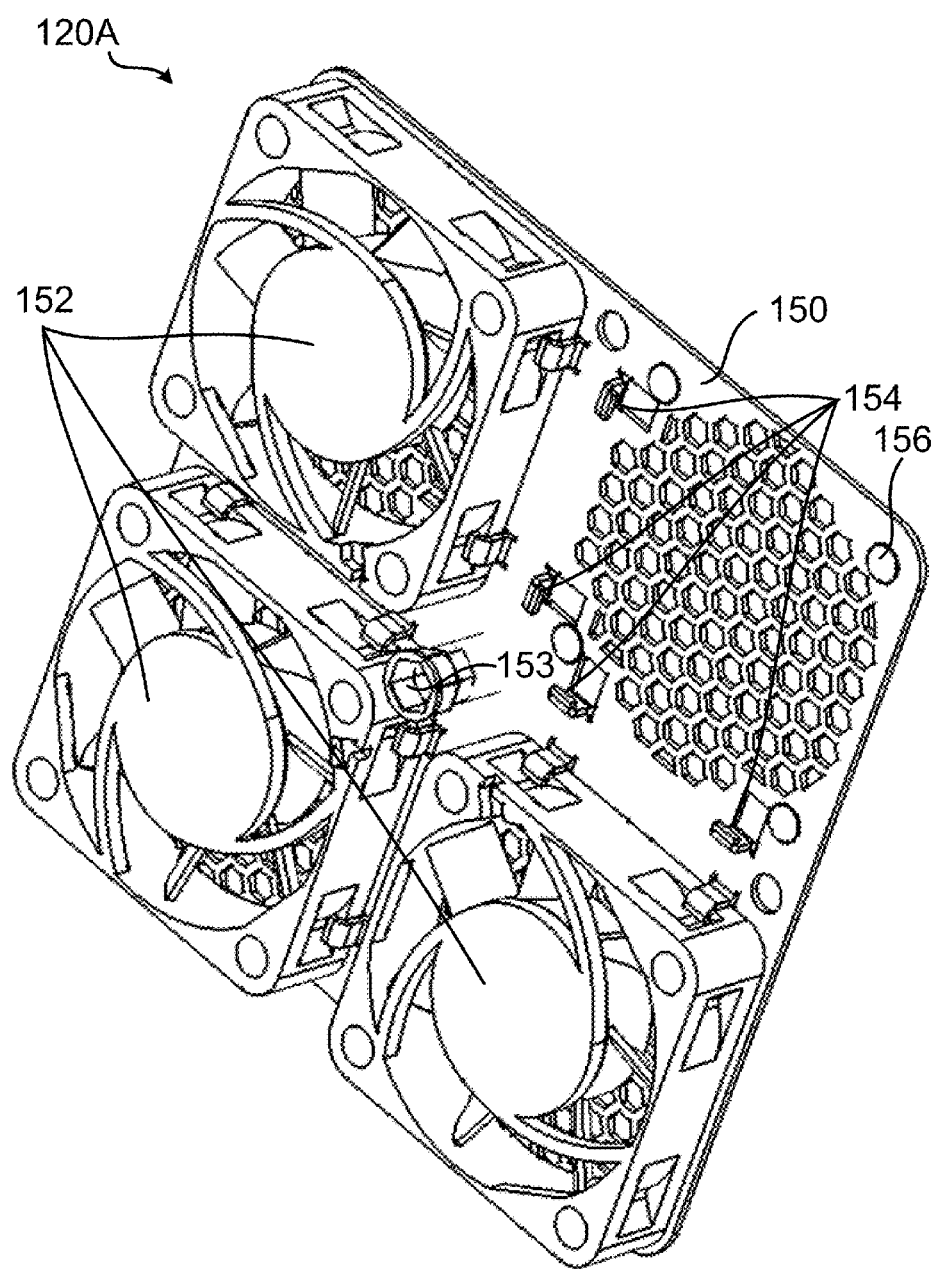
FIG. 15 is a drawing of a side perspective view of a fan assembly according to at least one embodiment disclosed herein.

FIG. 15 is a drawing of a side perspective view of the fan assembly 120A according to at least one embodiment disclosed herein. The fan assembly 120A includes a fan attachment plate 150, which is affixed to the housing 102. One or more fans 152 are affixed to the fan attachment plate 150. The fans 152 can be attached and removed individually.

To affix one or more of the fans 152 to the fan attachment plate 150, the fan attachment plate 150 includes securement tabs 154 and indention 156. The securement tabs 154 abut and cooperatively engage with an aperture in the fan 152 to secure the fan 152. The indention 156 is operative to receive a protrusion (not shown) of the fan 152. Thus, to install the fan 152 to the fan attachment plate 150, the fan 152 is essentially snapped into place on the fan attachment plate 150 without the use of threaded fasteners or other fasteners. In this configuration, one or more of the fans 152 can be installed in the modular computer enclosure with the use of a single fastener, such as the threaded fastener 153.

Figure 16:
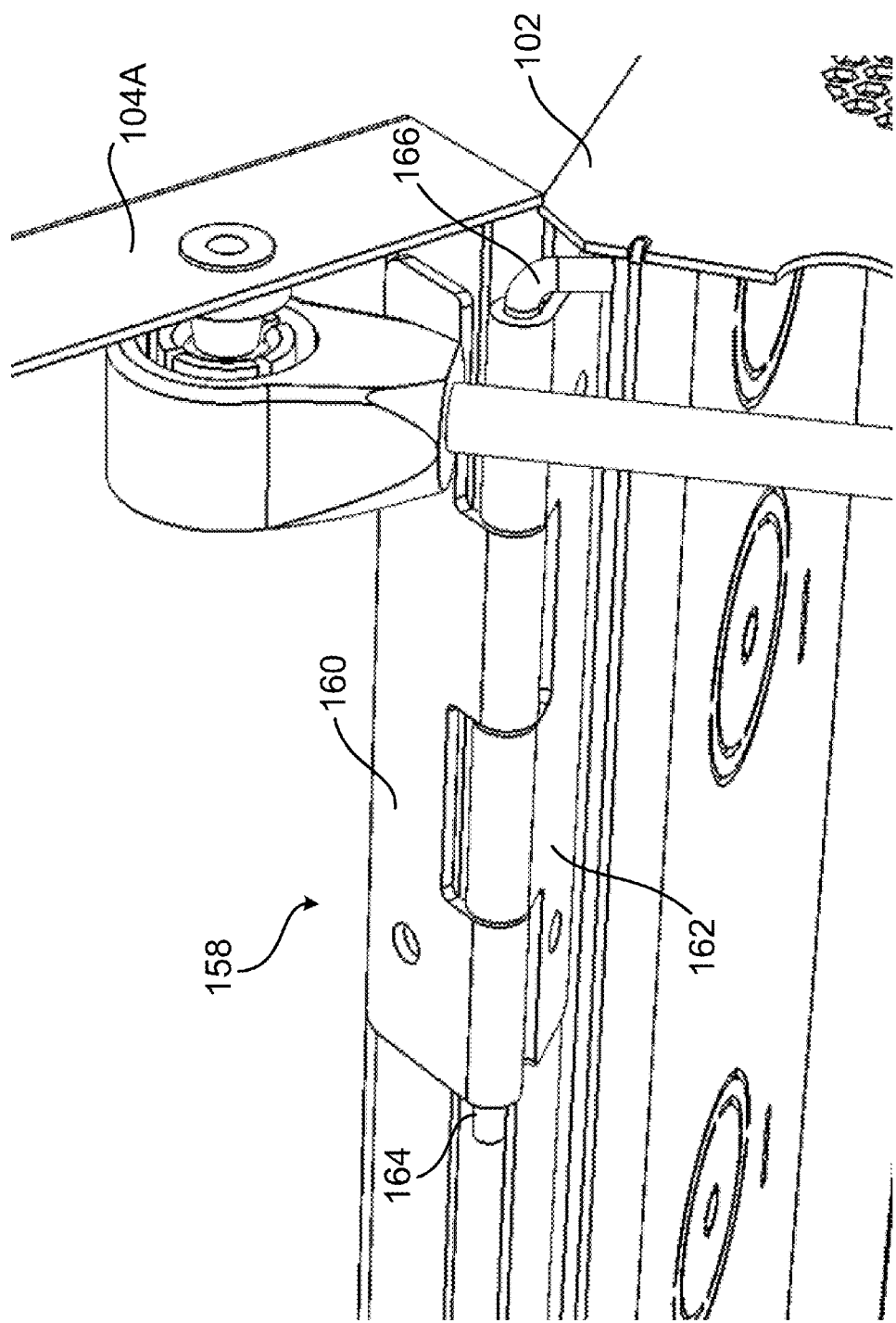
FIG. 16 is a drawing of a front perspective view of a hinge apparatus according to at least one embodiment described herein.

FIG. 16 is a drawing of a front perspective view of a hinge apparatus 158 according to at least one embodiment described herein. The hinge apparatus 158 includes a first hinge 160 fixedly attached to the first door 104A and a second hinge 162 fixedly attached to the housing 102. The first hinge 160 is rotatably coupled to the second hinge 162 through the use of hinge pin 164, which is inserted through the first hinge 160 and the second hinge 162.

In one configuration, the hinge apparatus 158 is configured so that the hinge pin 164 is only removable when the first door 104A is rotated to a suitable open position. In the configuration illustrated in FIG. 16, a hinge pin end 166 is sized and shaped that the hinge pin 164 is within the housing 102 when the first door 104A is in a shut or secured orientation. The shape of the first door 104A and the housing 102 are configured to prevent access to the hinge pin end 166 when in the shut orientation.

Figure 17:
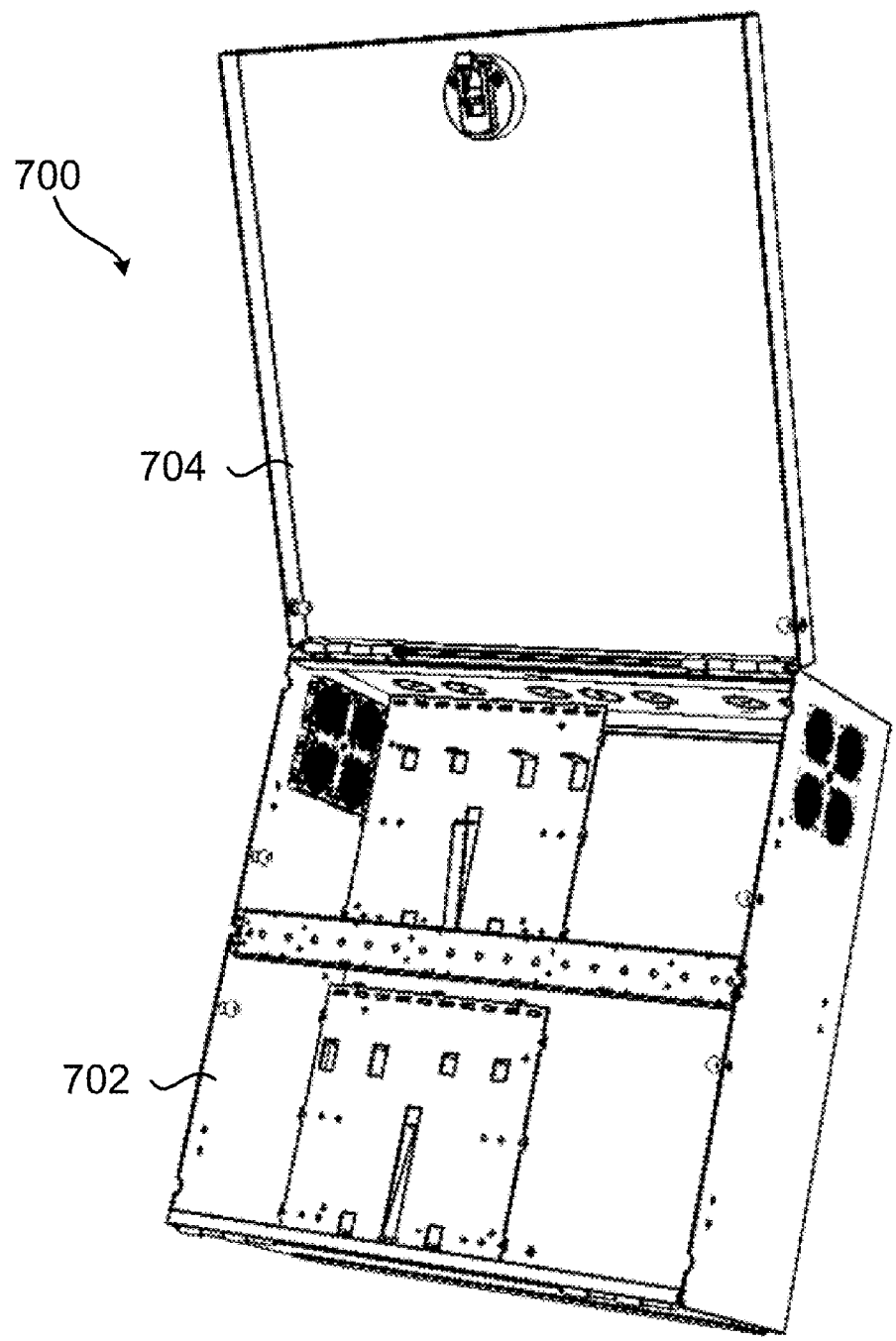
FIG. 17 is a drawing of side perspective view of a modular computer enclosure having a single door according to at least one embodiment disclosed herein.

FIG. 17 is a drawing of side perspective view of a modular computer enclosure 700 having a single door according to at least one embodiment disclosed herein. The modular computer enclosure 700 has a door 704 rotatably affixed to the enclosure 702. In the configuration illustrated in FIG. 17, the door 704 is configured to rotate in an upwards direction, the configuration illustrated.

Figure 18:
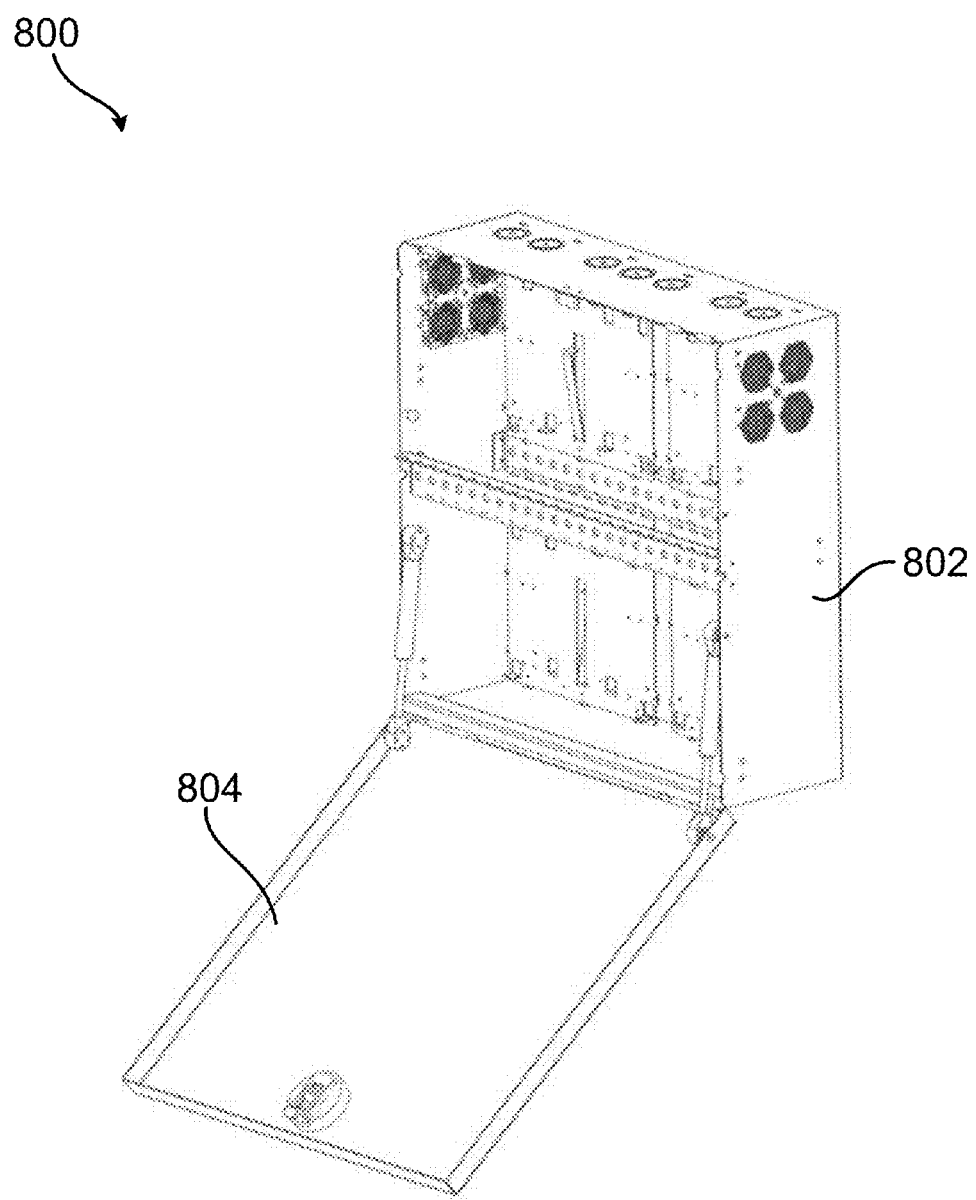
FIG. 18 is a drawing of side perspective view of a modular computer enclosure having a single door that rotates open in a downward direction according to at least one embodiment disclosed herein.

FIG. 18 is a drawing of side perspective view of a modular computer enclosure 800 having a single door that rotates open in a downward direction according to at least one embodiment disclosed herein. The modular computer enclosure 800 has a door 804 rotatably affixed to the enclosure 802. In the configuration illustrated in FIG. 18, the door 804 is configured to rotate open in a downward direction as opposed to the upward direction illustrated in FIG. 17

Figure 19:
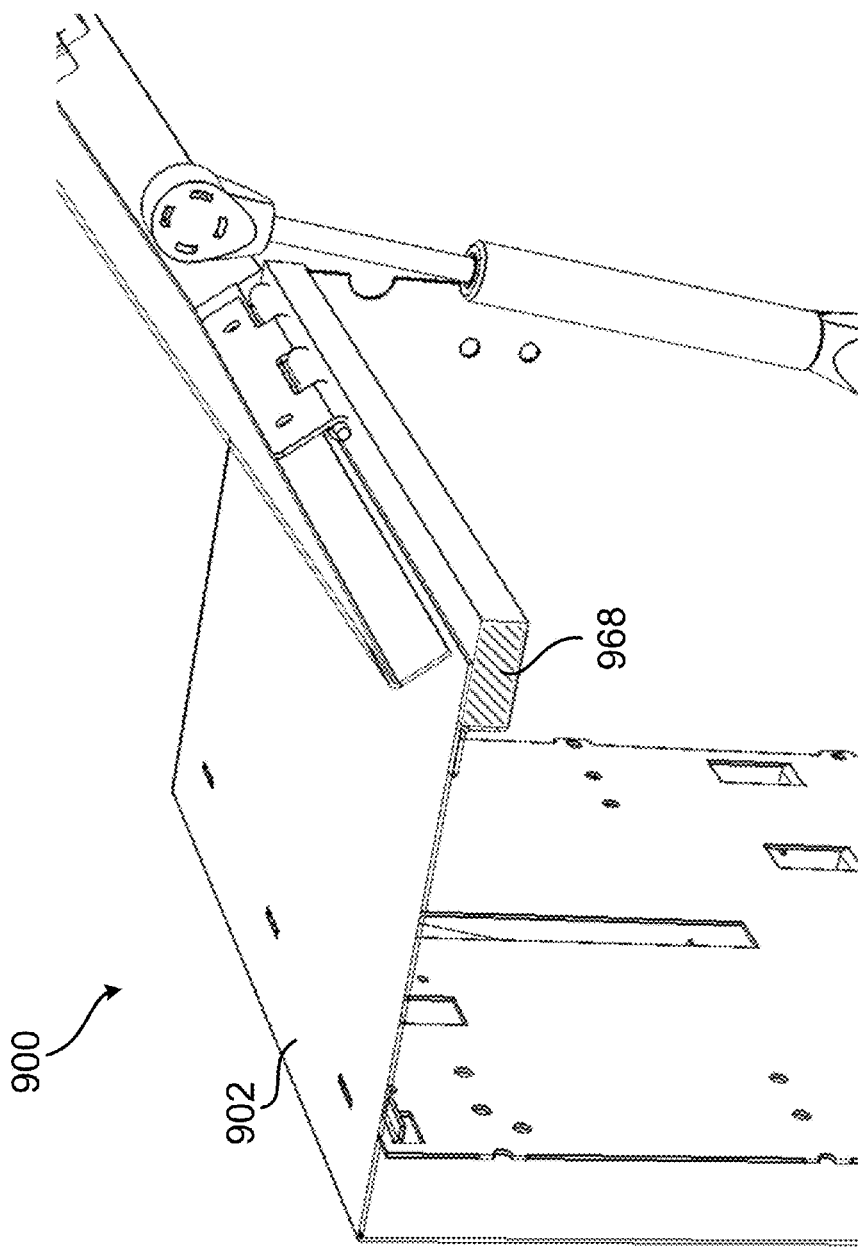
FIG. 19 is a drawing of a side perspective cross-sectional view of a modular enclosure using an air filter according to at least one embodiment disclosed herein.

FIG. 19 is a drawing of a side perspective cross-sectional view of a modular enclosure 900 using a filter according to at least one embodiment disclosed herein. The modular enclosure 900 includes a filter 968 that is disposed within a portion of the enclosure 902 and proximate to the top of the enclosure 902. The filter 968 is operative to filter at least a portion of the air entering the enclosure 902. The filter 968 can be constructed of various materials, including charcoal-based filters.

Figure 20:
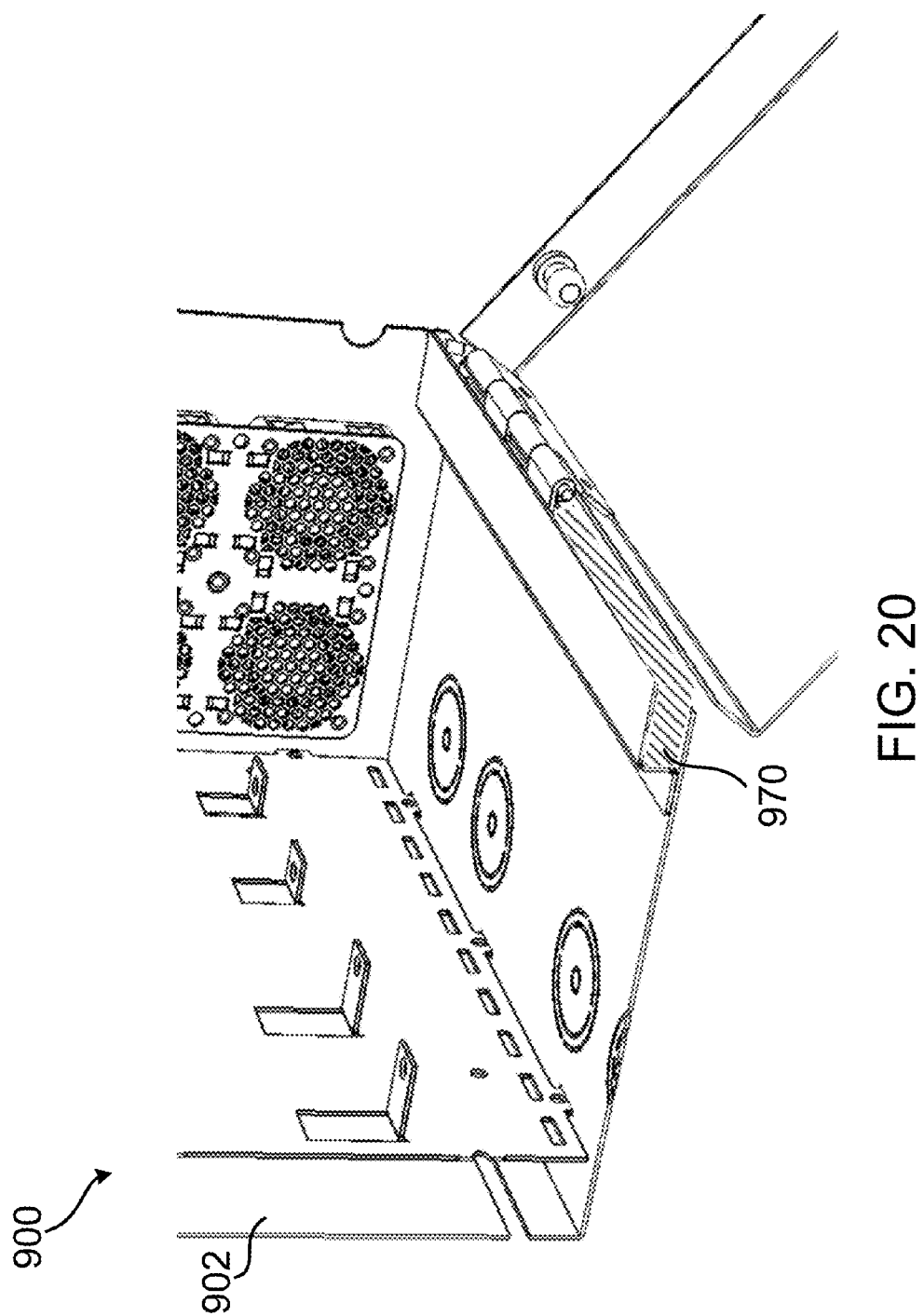
FIG. 20 is a drawing of a side perspective cross-sectional view of a modular computer enclosure using an additional air filter according to at least one embodiment disclosed herein.

FIG. 20 is a drawing of a side perspective cross-sectional view of the modular computer enclosure 900 using an additional filter according to at least one embodiment disclosed herein. The modular enclosure 900 includes a filter 970 that is disposed within a portion of the enclosure 902 and is proximate to the bottom of the housing 102. The filter 970 is operative to filter at least a portion of the air entering the enclosure 902. The filter 970 can be constructed of various materials, including charcoal-based filters.

Figure 21:
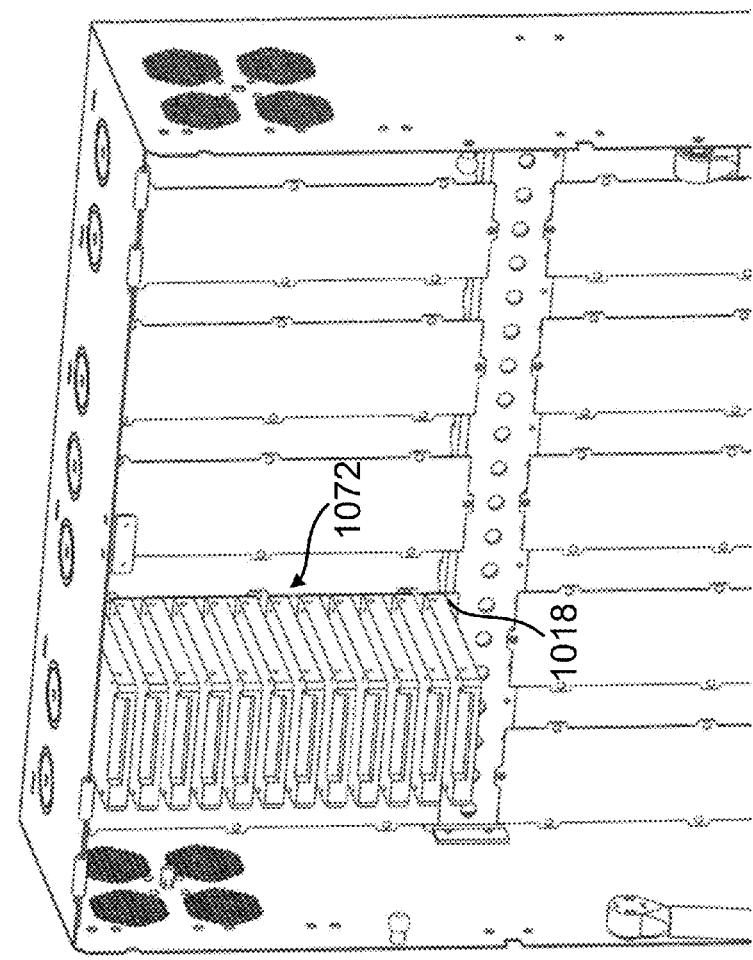
FIG. 21 is a drawing of a side perspective view of a modular computer enclosure having several computing components installed on a plate according to at least one embodiment disclosed herein.

FIG. 21 is a side perspective view of a modular computer enclosure 1000 having several computing components 1072 installed on a plate 1018 according to at least one embodiment disclosed herein. The plate 1018 may be configured to receive one or more of the computing components 1072.

Figure 22:
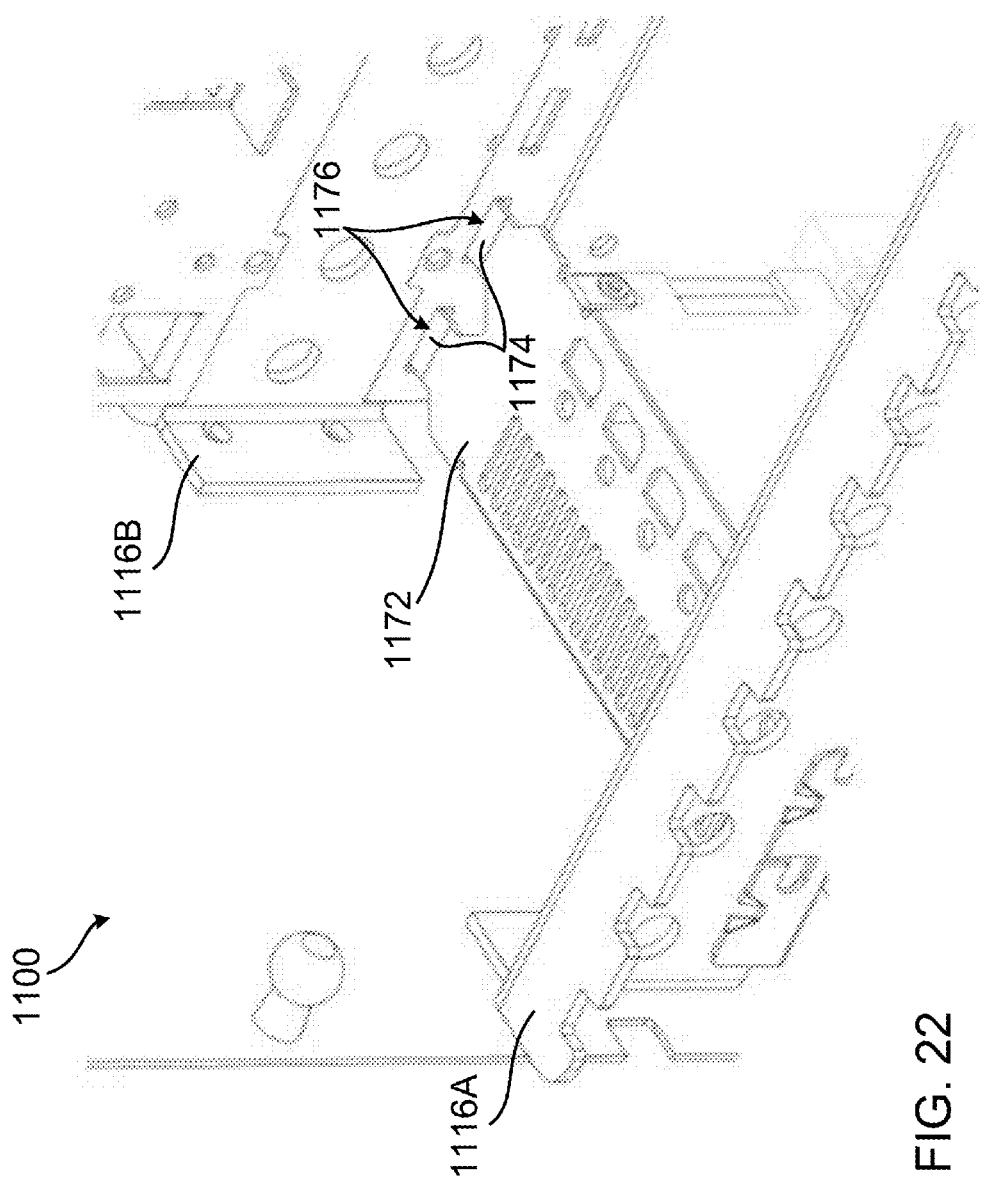
FIG. 22 is a drawing of a side perspective view of a modular computer enclosure with a computing component installed on both an outer bracket and an outer bracket according to at least one embodiment disclosed herein.

FIG. 22 is a side perspective view of a modular computer enclosure 1100 with computing component 1172 installed on both an outer bracket 1116A and an inner bracket 1116B according to at least one embodiment disclosed herein. The computing component 1172 has tabs 1174 operative to be received within apertures 1176 of the inner bracket 1116B.

Figure 23:
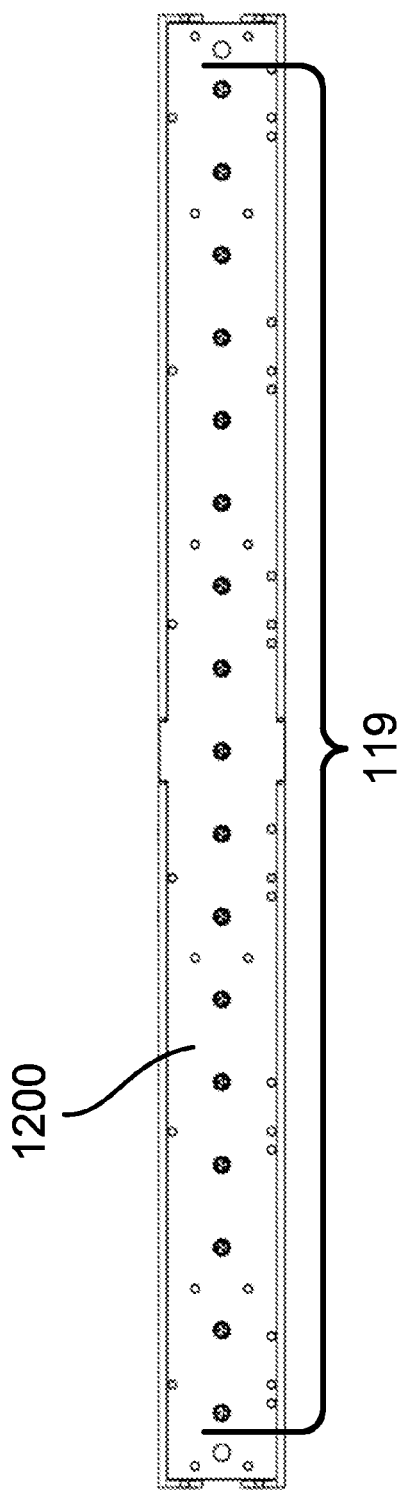
FIG. 23 is a drawing of a frontal view of a light emitting diode assembly configured to be installed on an outer bracket according to at least one embodiment disclosed herein.

FIG. 23 is a drawing of a frontal view of a light emitting diode assembly 1200 configured to be installed on the outer bracket 116A of FIG. 1 according to at least one embodiment disclosed herein. As mentioned above in regard to FIG. 1, in some configurations, it may be desirable or necessary to provide audible or visual indications to a user. In the configuration described in FIG. 1, the outer bracket 116A had the one or more light emitting diodes ("LEDs") 119 affixed to the outer bracket 116A.

FIG. 23 illustrates an alternate configuration, whereby the light emitting diode assembly 1200 is affixed to the inner bracket 116A, shown in more detail in FIG. 24, below. The light emitting diode assembly 1200 may include the LEDs 119. The LEDs 119 may be in communication in various manners to one or more of the computing components installed in the modular computer enclosure 102. For example, one or more of the LEDs may receive an output from a temperature sensor and turn on when a set point is reached. In the same example, another one of the LEDs may indicate door positions, lighting up when a door is open. These and other configurations are considered to be within the scope of the present disclosure.

Figure 24:
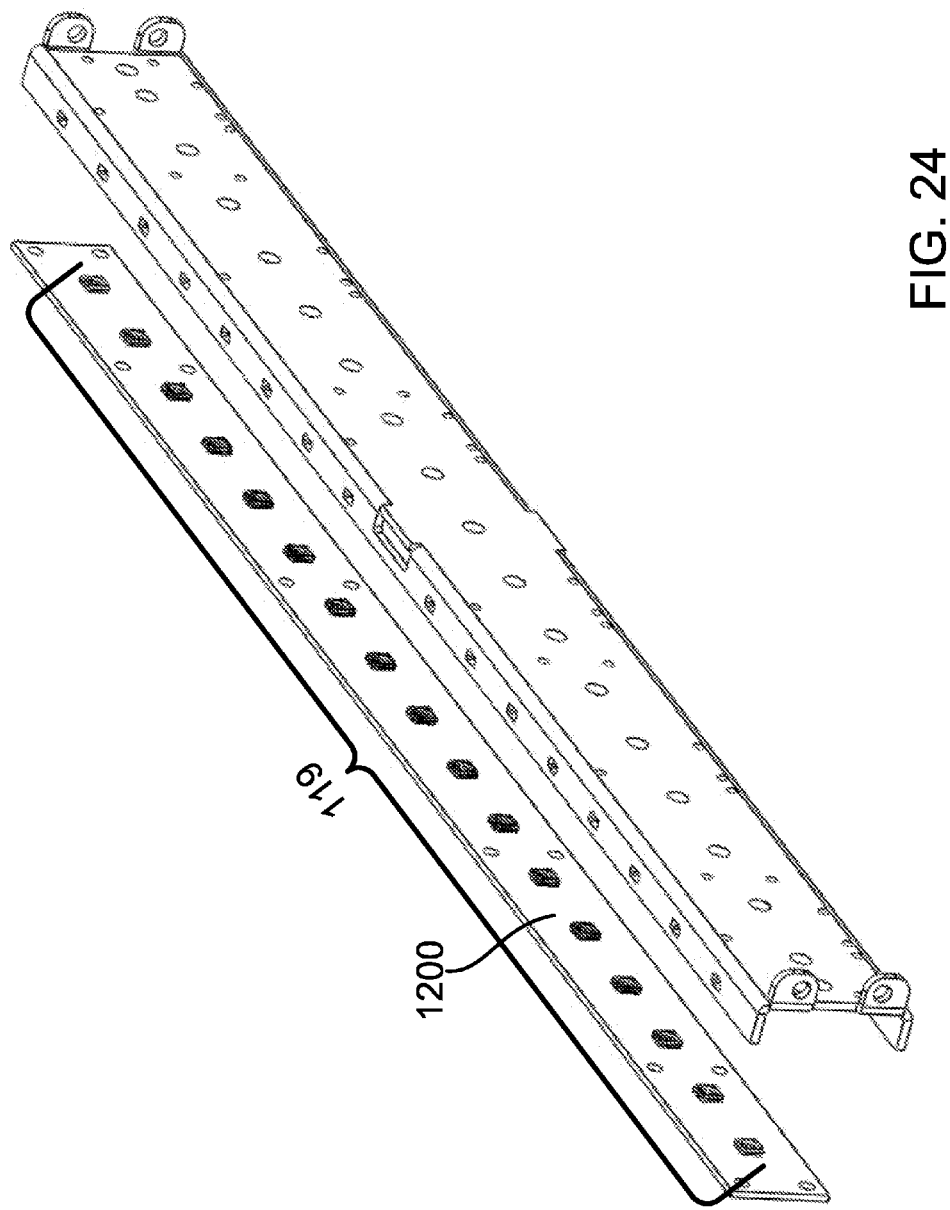
FIG. 24 is a drawing of a top perspective view of a light emitting diode assembly configured to be installed on an outer bracket according to at least one embodiment disclosed herein.

FIG. 24 is a drawing of a top perspective view of the light emitting diode assembly 1200 configured to be installed on the outer bracket 116A according to at least one embodiment disclosed herein. The light emitting diode assembly 1200 may be removably affixed to the outer bracket 116A. The light emitting diode assembly 1200 and the outer bracket 116A may be sized and shaped so that when the first door 104A and/or the second door 104B are secured to the outer bracket 116A, the LEDs 119 on the light emitting diode assembly 1200 are viewed outside of the modular computer enclosure 100.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A modular computer enclosure, comprising:
   a housing configured to house components within the housing;
   a door rotatably coupled to the housing;
   a modular bracket system affixed to the housing, the modular bracket system comprising an inner bracket configured to receive a plate; and
   the plate comprising one or more securement appendages to receive one or more computing components.

2. The modular computer enclosure of claim 1, wherein the plate is coupled to the housing through at least one tab of the plate inserted within at least one aperture of the housing.

3. The modular computer enclosure of claim 1, wherein the plate is coupled to the inner bracket using a threaded fastener.

4. The modular computer enclosure of claim 1, further comprising an outer bracket operative to receive a second plate or at least one computing component.

5. The modular computer enclosure of claim 4, further comprising a circuit board mounted to the outer bracket comprising at least one visual indicator.

6. The modular computer enclosure of claim 5, wherein the visual indicator is a light emitting diode.

7. The modular computer enclosure of claim 5, wherein the outer bracket is configured so that the visual indicator is viewable when the door is in a closed position.

8. The modular computer enclosure of claim 1, further comprising a plurality of plates affixed to the inner bracket.

9. The modular computer enclosure of claim 8, wherein the plurality of plates are of different sizes.

10. The modular computer enclosure of claim 1, wherein the door is rotatably coupled to the housing using a hinge apparatus, the hinge apparatus comprising
    a first hinge fixedly attached to the door,
    a second hinge fixedly attached to the housing, and
    a hinge pin inserted through the first hinge and the second hinge, wherein the hinge pin is sized and shaped that the hinge pin not removable when the door is in a shut orientation and removable when the door is in an open orientation, but removable if inserted from the center of the housing.

11. The modular computer enclosure of claim 1, further comprising a first air filter disposed within a portion of the housing and proximate to a top of the housing, wherein the first air filter is configured to filter at least a portion of air entering the housing.

12. The modular computer enclosure of claim 11, further comprising a second air filter disposed proximate to the bottom of the housing, wherein the second air filter is configured to filter at least a portion of air entering the housing.

13. The modular computer enclosure of claim 1, further comprising a fan assembly operative to pull air from inside the housing and exhaust the air outside the housing.

14. The modular computer enclosure of claim 13, wherein the fan assembly comprises a fan attachment plate and at least one fan and a securement tab, wherein the fan attachment plate and securement tab are operative to receive and secure the at least one fan without a threaded fastener.

15. The modular computer enclosure of claim 14, wherein the fan attachment plate comprises at least one securement tab and an indention, wherein at least one securement tab is operative to abut and cooperatively engage with an aperture in the at least one fan to secure the at least one fan to the fan attachment plate.

16. The modular computer enclosure of claim 14, wherein the fan attachment plate is attached to the housing using a single fastener.

17. The modular computer enclosure of claim 1, further comprising a locking mechanism to secure the door.

18. The modular computer enclosure of claim 1, wherein the door is operative to rotate open in a downward direction.

19. The modular computer enclosure of claim 18, further comprising a support designed to extend in a controlled manner to provide a smooth opening motion for the door.

20. The modular computer enclosure of claim 1, wherein the door is operative to rotate open in an upward direction.

21. The modular computer enclosure of claim 20, further comprising a support designed to maintain a position of the door.

22. The modular computer enclosure of claim 1, further comprising a second door, wherein the door is operative to rotate open in an upward direction and the second door is operative to rotate open in a downward direction.

23. The modular computer enclosure of claim 1, a wall mount configured for attachment to a wall, the wall mount comprising a wall mount lip designed to be received within a channel of the housing.

24. The modular computer enclosure of claim 23, further comprising a wall mount support designed to receive at least a portion of the weight of the housing if the wall mount lip cannot support all or a portion of the weight of the housing.

25. A modular computer enclosure, comprising:
- a housing configured to house components within the housing;
- a first door rotatably coupled to the housing through a first hinge apparatus and proximate to a top portion of the housing;
- a second door rotatably coupled to the housing through a second hinge apparatus and proximate to a bottom portion of the housing;
- the first hinge apparatus and the second hinge apparatus each comprising
  - a first hinge fixedly attached to the first door or the second door,
  - a second hinge fixedly attached to the housing, and
  - a hinge pin inserted through the first hinge and the second hinge, whereby the hinge pin is sized and shaped that the hinge pin not removable when the door is in a shut orientation and removable when the door is in an open orientation;
- a first plurality of supports coupled to the first door and the housing, the first plurality of supports configured to maintain the first door in a desired position;
- a second set of supports coupled to the second door and the housing, the second set of supports configured to extend in a controlled manner to provide a smooth opening motion for the second door;
- a first filter disposed within a portion of the housing and proximate to the top portion of the housing, wherein the first filter is configured to filter at least a portion of air entering the housing;
- a second filter disposed proximate to the bottom portion of the housing, wherein the second is configured to filter at least a portion of air entering the housing;
- a modular bracket system affixed to the housing, the modular bracket system comprising
  - an inner bracket configured to receive at least a first plate, and
  - an outer bracket configured to receive at least a second plate,
  - wherein the inner bracket and the outer bracket are further configured to receive a first computing component; and
- the plate configured to receive the first computing component or a plurality of second computing components.

26. The modular computer enclosure of claim 25, further comprising a light emitting diode assembly affixed to the outer bracket, the light emitting diode assembly comprising at least one light emitting diode.

27. The modular computer enclosure of claim 26, wherein the at least one light emitting diode is in communication with a computing component installed in the modular computer enclosure and configured to provide a visual indication.

* * * * *